(12) United States Patent  (10) Patent No.: US 11,236,245 B2
Chidate et al.  (45) Date of Patent: Feb. 1, 2022

(54) PIGMENT TEXTILE PRINTING INK JET INK COMPOSITION, PIGMENT TEXTILE PRINTING INK JET INK COMPOSITION SET, AND INK JET PIGMENT TEXTILE PRINTING METHOD

(71) Applicant: SEIKO EPSON CORPORATION, Tokyo (JP)

(72) Inventors: Kosuke Chidate, Shiojiri (JP); Masakazu Ohashi, Shiojiri (JP); Toshiyuki Miyabayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 156 days.

(21) Appl. No.: 16/270,943

(22) Filed: Feb. 8, 2019

(65) Prior Publication Data

US 2019/0249021 A1   Aug. 15, 2019

(30) Foreign Application Priority Data

Feb. 9, 2018  (JP) .............................. JP2018-022194

(51) Int. Cl.
   *C09D 11/322*  (2014.01)
   *C09D 11/38*  (2014.01)
   (Continued)

(52) U.S. Cl.
   CPC ........... *C09D 11/322* (2013.01); *B41J 2/2107* (2013.01); *B41J 2/2114* (2013.01); *C09D 11/037* (2013.01);
   (Continued)

(58) Field of Classification Search
   CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 25/312; B41J 2025/008; B41J 2202/21;
   (Continued)

(56) References Cited

U.S. PATENT DOCUMENTS

2006/0132575 A1* 6/2006 Fukuda .................. B41J 15/048
                                                        347/104
2007/0103529 A1* 5/2007 Pearl .................... B41M 5/0011
                                                        347/101

(Continued)

FOREIGN PATENT DOCUMENTS

EP   3 421 553 A1   1/2019
JP   2008-266853 A   11/2008
(Continued)

OTHER PUBLICATIONS

Jul. 10, 2019 Search Report issued in European Patent Application No. 19156277.6.

*Primary Examiner* — Manish S Shah
(74) *Attorney, Agent, or Firm* — Oliff PLC

(57) ABSTRACT

A pigment textile printing ink jet ink composition contains a pigment, a resin particle, a nonionic fluorine-based surfactant, and water.

6 Claims, 1 Drawing Sheet

(51) Int. Cl.
*C09D 11/037* (2014.01)
*D06P 5/30* (2006.01)
*C09D 11/102* (2014.01)
*B41J 3/407* (2006.01)
*D06P 3/52* (2006.01)
*B41J 2/21* (2006.01)

(52) U.S. Cl.
CPC ............ *C09D 11/102* (2013.01); *C09D 11/38* (2013.01); *D06P 5/30* (2013.01); *B41J 3/4078* (2013.01); *D06P 3/52* (2013.01)

(58) Field of Classification Search
CPC .. B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 2/04588; B41M 2/04595; B41M 2/04586; B41M 2/14274; B41M 5/2227
See application file for complete search history.

(56) References Cited

U.S. PATENT DOCUMENTS

| | | | |
|---|---|---|---|
| 2012/0160372 A1* | 6/2012 | Inbe | C09D 5/002 148/240 |
| 2013/0249996 A1 | 9/2013 | Saito et al. | |
| 2014/0118449 A1* | 5/2014 | Sarkisian | B41J 2/2107 347/101 |
| 2015/0239261 A1* | 8/2015 | Sugiyama | C09D 11/38 347/21 |
| 2015/0361282 A1* | 12/2015 | Nakagawa | B41J 2/01 428/207 |
| 2016/0060810 A1* | 3/2016 | Saito | D06P 1/5221 347/21 |
| 2016/0264808 A1* | 9/2016 | Kido | C09D 11/106 |
| 2016/0333211 A1* | 11/2016 | Miyajima | C09D 11/30 |
| 2016/0355695 A1* | 12/2016 | Nakagawa | C09D 11/326 |

FOREIGN PATENT DOCUMENTS

| | | |
|---|---|---|
| JP | 2011-105915 A | 6/2011 |
| JP | 2013-199719 A | 10/2013 |

* cited by examiner

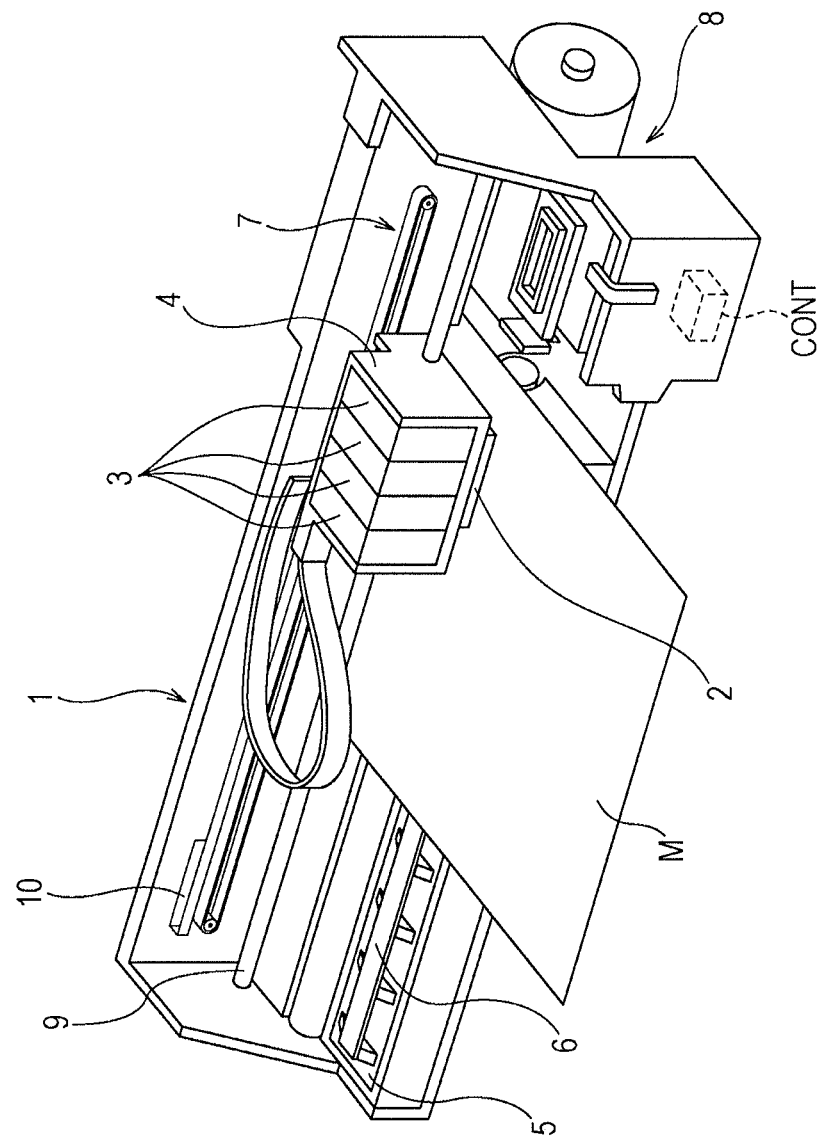

PIGMENT TEXTILE PRINTING INK JET INK COMPOSITION, PIGMENT TEXTILE PRINTING INK JET INK COMPOSITION SET, AND INK JET PIGMENT TEXTILE PRINTING METHOD

BACKGROUND

1. Technical Field

The present invention relates to a pigment textile printing ink jet ink composition, a pigment textile printing ink jet ink composition set, and an ink jet pigment textile printing method.

2. Related Art

Dyeing (textile printing) of fabrics and the like has been performed using an ink jet recording method. As a recording method for fabrics (textiles or nonwoven fabrics), a screen textile printing method, a roller textile printing method, and the like have been used heretofore. However, it is advantageous to apply an ink jet recording method from the viewpoint of wide-variety small-lot production properties, immediate printability, and the like, and therefore various examinations have been made.

In a textile printing ink jet recording method, an examination has been made also for a so-called ink jet pigment textile printing method (hereinafter also simply referred to as "pigment textile printing") including compounding a pigment and a fixing resin with an ink composition (hereinafter also simply referred to as "ink"), and then textile printing a fabric. In the pigment textile printing, because of the ink permeating into the fabric, the color developability decreases in some cases, and thus an improvement of the color developability has been demanded. Particularly in a fabric containing polyester or polyester mixed yarn, the ink is liable to sink into the fabric, and therefore it is difficult to obtain good color development.

Then, it is known to use a pretreatment agent in pigment textile printing to physically fix the pigment to a surface of fibers or the like of the fabric for the purpose of an improvement of the color developability of a printed textile to be obtained (for example, see JP-A-2008-266853).

However, in an ink jet pigment textile printing method using a pigment textile printing ink jet ink composition, sufficient color developability is not achieved even by the above-described technique, and thus a further improvement of the color developability has been demanded.

SUMMARY

An advantage of some aspects of the invention is to provide a pigment textile printing ink jet ink composition, a pigment textile printing ink jet ink composition set, and an ink jet pigment textile printing method which provide a printed textile excellent in color developability.

The invention can be realized as the following aspects or application examples.

Application Example 1

A pigment textile printing ink jet ink composition according to a first aspect of the invention contains a pigment, a resin particle, a nonionic fluorine-based surfactant, and water.

Application Example 2

In Application Example 1, the pigment textile printing ink jet ink composition is used by being attached to a fabric and the fabric can contain polyester or polyester mixed yarn.

Application Example 3

In Application Example 1 or Application Example 2, the nonionic fluorine-based surfactant can have an HLB value within a range of 6 or more and 15 or less.

Application Example 4

In any one of Application Example 1 to Application Example 3, the nonionic fluorine-based surfactant can have a polyoxyethylene group and an alkyl fluoride group.

Application Example 5

In any one of Application Example 1 to Application Example 4, a content of the nonionic fluorine-based surfactant can be 0.1% by mass or more and 0.8% by mass or less relative to a total mass of the pigment textile printing ink jet ink composition.

Application Example 6

In any one of Application Example 1 to Application Example 5, the resin particle can be a polycarbonate-based urethane resin particle.

Application Example 7

In any one of Application Example 1 to Application Example 6, amine having a normal boiling point at 25° C. of 200° C. or more can be further contained.

Application Example 8

In any one of Application Example 1 to Application Example 7, the pigment can be a white pigment.

Application Example 9

A pigment textile printing ink jet ink composition set according to a second aspect of the invention contains the pigment textile printing ink jet ink composition according to any one of Application Example 1 to Application Example 8 and a chromatic color pigment textile printing ink jet ink composition containing a chromatic color pigment, a resin particle, and water.

Application Example 10

An ink jet pigment textile printing method according to a third aspect of the invention includes attaching the pigment textile printing ink jet ink composition according to any one of Application Example 1 to Application Example 8 to a fabric, and then attaching a chromatic color pigment textile printing ink jet ink composition containing a chromatic color pigment, a resin particle, and water to the fabric on a region where the pigment textile printing ink jet ink composition is attached.

Application Example 11

In Application Example 10, the chromatic color pigment textile printing ink jet ink composition further contains a nonionic fluorine-based surfactant and a content of the nonionic fluorine-based surfactant in the chromatic color pigment textile printing ink jet ink composition can be 0.5% by mass or less relative to a total mass of the chromatic color pigment textile printing ink jet ink composition.

Application Example 12

In Application Example 10 or Application Example 11, the fabric can be a fabric to which a polyvalent metal salt is attached.

BRIEF DESCRIPTION OF THE DRAWINGS

The invention will be described with reference to the accompanying drawing, wherein like numbers reference like elements.

FIGURE is a schematic perspective view of a textile printing apparatus performing an ink jet pigment textile printing method according to this embodiment.

DESCRIPTION OF EXEMPLARY EMBODIMENTS

Hereinafter, some embodiments of the invention are described. The embodiments described below describe examples of the invention. The invention is not limited to the following embodiments at all and also includes various modifications to be implemented without altering the gist of the invention. All the configurations described below are not necessarily indispensable configurations of the invention.

Hereinafter, with respect to a pigment textile printing ink jet ink composition, a pigment textile printing ink jet ink composition set, and an ink jet pigment textile printing method according to this embodiment, the configuration of a textile printing apparatus capable of implementing the same, a pigment textile printing ink jet ink composition (hereinafter also referred to as "pigment textile printing ink", "ink composition", or "ink"), a pigment textile printing ink jet ink composition set containing the same (hereinafter also referred to as "ink set"), a treatment liquid composition which may configure the pigment textile printing ink jet ink composition set with the pigment textile printing ink jet ink composition (hereinafter also referred to as "treatment liquid"), a fabric to which the ink jet pigment textile printing method is applied, and an ink jet pigment textile printing method are described in detail in this order.

1. TEXTILE PRINTING APPARATUS

First, an example of a textile printing apparatus to be used in this embodiment is described with reference to the drawing. The textile printing apparatus to be used in this embodiment is not limited to the following aspect.

The textile printing apparatus to be used in this embodiment is described taking an on-carriage type printer in which an ink cartridge is mounted in a carriage as an example. However, the textile printing apparatus is not limited to the on-carriage type printer and may be an off-carriage type printer in which an ink cartridge is not mounted in a carriage and is fixed to the outside.

A printer to be used for the following description is a serial printer in which a print head is mounted in a carriage moving in the predetermined direction and which discharges droplets onto a recording medium by the movement of a head in connection with the movement of the carriage. The textile printing apparatus to be used in the invention is not limited to the serial printer and may be a line printer in which a head is formed to be larger than the width of a recording medium and which discharges droplets onto a recording medium without the movement of a print head.

In a FIGURE used for the following description, the scale of each member is changed as appropriate so that each member can be recognized.

As the textile printing apparatus, an ink jet printer (hereinafter also referred to as "printer") mounted with an ink jet head illustrated in FIGURE is mentioned, for example. As illustrated in FIGURE, a printer 1 has a carriage 4 which is mounted with an ink jet head 2 and to which an ink cartridge 3 is detachably attached, a platen 5 which is disposed below the ink jet head 2 and to which a fabric M which is a recording medium is transported, a heating mechanism 6 for heating the fabric M, a carriage moving mechanism 7 causing the carriage 4 to move in a medium width direction of the fabric M, and a medium feeding mechanism 8 transporting the fabric M in a medium feeding direction. Moreover, the printer 1 has a control device CONT controlling an operation of the whole printer 1. The medium width direction is a main scanning direction (head scanning direction). The medium feeding direction is a subscanning direction (direction orthogonal to the main scanning direction).

The ink jet head 2 is a unit for attaching an ink to the fabric M and is provided with a plurality of nozzles (not illustrated) discharging the ink on a surface opposite to the fabric M to which the ink is attached. The plurality of nozzles is arranged in an array shape, and thus a nozzle surface is formed on the nozzle plate surface.

Examples of systems of discharging an ink from nozzles include, for example, a system (electrostatic suction system) of applying a strong electric field between the nozzles and an accelerating electrode placed in front of the nozzles to continuously discharge an ink in the form of droplets from the nozzles and discharging the ink droplets corresponding to a recording information signal while the ink droplets are flying between deflecting electrodes; a system of applying a pressure to a treatment liquid with a small pump to mechanically vibrate nozzles with a quartz oscillator or the like to thereby forcibly discharge ink droplets; a system (piezoelectric system) of simultaneously applying a pressure and a recording information signal to an ink with a piezoelectric element to discharge and record ink droplets; a system (thermal ink system) of heating and foaming an ink with a microelectrode according to a recording information signal to discharge and record ink droplets; and the like.

As the ink jet head 2, both a line type ink jet head and a serial type ink jet head are usable and the serial type ink jet head is used in this embodiment.

Herein, the textile printing apparatus provided with the serial type ink jet head performs recording by performing scanning (path) of discharging an ink while moving an ink jet head for recording relative to a recording medium several times. Specific examples of the serial type ink jet head include one in which an ink jet head is mounted in a carriage moving in the width direction (direction crossing the transporting direction of the recording medium) of a recording medium and which discharges droplets onto the recording medium by the movement of the ink jet head in connection with the movement of the carriage.

On the other hand, the textile printing apparatus provided with the line type ink jet head performs recording by performing scanning (path) of discharging an ink once while moving the ink jet head relative to a recording medium. Specific examples of the line type ink jet head include one in which the ink jet head is formed to be larger than the width of a recording medium and which discharges droplets onto the recording medium without the movement of the ink jet head.

The ink cartridge 3 supplying an ink to the ink jet head 2 contains four independent cartridges. Each of the four cartridges is filled with a different kind of ink, for example. The ink cartridge 3 is detachably attached to the ink jet head 2. In the example of FIGURE, the number of the cartridges is four but a desired number of cartridges can be mounted without being limited thereto.

The carriage 4 is attached in a state of being supported with a guide rod 9 which is a support member installed in the main scanning direction. The carriage 4 moves in the main scanning direction along the guide rod 9 by the carriage moving mechanism 7. Although the example of FIGURE illustrates one in which the carriage 4 moves in the main scanning direction, the invention is not limited thereto and one moving in the subscanning direction in addition to the movement in the main scanning direction may be acceptable.

The installation position of the heating mechanism 6 is not particularly limited insofar as the heating mechanism 6 is provided at a position where the fabric M can be heated. In the example of FIGURE, the heating mechanism 6 is disposed at a position which is located on the platen 5 and in which the heating mechanism 6 faces the ink jet head 2. Thus, when the heating mechanism 6 is disposed at the position where the heating mechanism 6 faces the ink jet head 2, the attachment position of droplets in the fabric M can be certainly heated, and therefore the droplets attached to the fabric M can be efficiently dried.

For the heating mechanism 6, a print heater mechanism of bringing the fabric M into contact with a heat source for heating, a mechanism of emitting infrared rays, microwaves (electromagnetic waves having a maximum wavelength around 2,450 MHz), or the like, a drier mechanism spraying warm air, and the like are usable, for example.

The heating of the fabric M by the heating mechanism 6 is performed before or when the droplets discharged from the nozzles of the ink jet head 2 are attached to the fabric M. The control (for example, the timing of performing the heating, heating temperature, heating time, and the like) of the conditions for the heating is performed by the control device CONT.

The heating of the fabric M by the heating mechanism 6 is performed so that the fabric M holds the temperature range of 35° C. or more and 65° C. or less from the viewpoint of an improvement of the wettability and spreadability, permeability, and drying property, discharge stability, and the like of an ink. Herein, the temperature for heating the fabric M means the temperature of the surface of the recording surface of the fabric M in heating.

The printer 1 may further have a second heating mechanism which is not illustrated besides the heating mechanism 6. In that case, the second heating mechanism is disposed on the downstream side in the transporting direction of the fabric M relative to the heating mechanism 6. The second heating mechanism heats the fabric M after the fabric M is heated by the heating mechanism 6, i.e., after the droplets discharged from the nozzles are attached to the fabric M. Thus, the drying property of the droplets of the ink attached to the fabric M is improved. For the second heating mechanism, any one of the mechanisms described for the heating mechanism 6 (for example, drier mechanism, heat press machine, and the like) is usable. The heating by the second heating mechanism is preferably performed so that the fabric M holds the temperature range of 100° C. or more and 200° C. or less.

A linear encoder 10 detects the position in the main scanning direction of the carriage 4 by a signal. The detected signal is transmitted to the control device CONT as position information. The control device CONT recognizes the scanning position of the recording head 2 based on the position information from the linear encoder 10 to control a recording operation (discharge operation) by the recording head 2 and the like. Moreover, the control device CONT is configured so as to be able to variably control the movement speed of the carriage 4.

2. PIGMENT TEXTILE PRINTING INK JET INK COMPOSITION

The pigment textile printing ink jet ink composition according to this embodiment contains a pigment, resin particles, a nonionic fluorine-based surfactant, and water. Hereinafter, the pigment textile printing ink jet ink composition is described.

The pigment textile printing ink jet ink composition according to this embodiment configures the pigment textile printing ink jet ink composition set according to this embodiment. The pigment textile printing ink jet ink composition set according to this embodiment contains at least one pigment textile printing ink jet ink composition according to this embodiment. When the pigment textile printing ink jet ink composition set according to this embodiment contains a plurality of the pigment textile printing ink jet ink compositions, it is preferable that one of the pigment textile printing ink jet ink compositions is a white pigment textile printing ink jet ink composition containing a white pigment as the pigment and the other pigment textile printing ink jet ink compositions are chromatic color pigment textile printing ink jet ink compositions containing a chromatic color pigment. In this case, two-layer printing of performing color printing on a white base is enabled in the ink jet pigment textile printing method described later. The pigment textile printing ink jet ink composition set according to this embodiment preferably contains a treatment liquid composition in order to further improve the color developability.

2.1. Pigment

The pigment textile printing ink jet ink composition according to this embodiment contains a pigment. Due to the attachment of the pigment to a fabric, the fabric is textile printed, so that a printed textile (printed matter) is formed.

As the pigment, both organic pigments and inorganic pigments are usable and a pigment of any color is usable. When configuring the pigment textile printing ink jet ink composition set described later, it is preferable that one of the plurality of pigment textile printing ink jet ink compositions contains a white pigment as the pigment and the other pigment textile printing ink jet ink compositions contain chromatic color pigments. The pigment textile printing ink jet ink composition according to this embodiment can obtain a printed textile excellent in color developability in both the case where a white pigment is contained as the pigment and the case where a chromatic color pigment is contained as the pigment.

Examples of the white pigment include, but are not limited to the following substances, white inorganic pigments, such as titanium oxide, zinc oxide, zinc sulfide, antimony oxide, and zirconium dioxide, and the like. In addition to the white inorganic pigments, white organic pigments, such as white hollow resin particles and polymer particles, are also usable.

Examples of the Color Index (C.I.) of the white pigment include, but are not limited to the following substances, C.I. Pigment White 1 (basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), 23 (gloss white), 24 (alumina white), 25 (gypsum), 26 (magnesium oxide-silicon oxide), 27 (silica), 28 (anhydrous calcium silicate), and the like, for example. Among the above, titanium oxide is preferable as the white pigment because the color developability, the concealing properties, and the visibility (brightness) are excellent and a good dispersion particle size is obtained.

Among the titanium oxides, a rutile type titanium oxide common as the white pigment is preferable. The rutile type titanium oxide may be produced by oneself or may be a commercially available substance. Examples of industrial production methods when the rutile type titanium oxide (powdered) is produced by oneself include known sulfuric acid method and chlorine method. Examples of commercially-available items of the rutile type titanium oxide include, for example, rutile types, such as Tipaque (Registered Trademark) CR-60-2, CR-67, R-980, R-780, R-850, R-980, R-630, R-670, and PF-736 (all Trade Names, manufactured by Ishihara Sangyo Kaisha, Ltd.).

Examples of the chromatic color pigments include pigments except the white pigments mentioned above. As the pigments other than the white pigments, although not limited to the following substances, azo-based, phthalocyanine-based, dye-based, condensed polycyclic-based, nitro-based, and nitroso-based organic pigments (Brilliant Carmine 6B, Lake Red C, Watching Red, Disazo Yellow, Hansa Yellow, Phthalocyanine Blue, Phthalocyanine Green, Alkali Blue, Aniline Black, and the like), metals, such as cobalt, iron, chromium, copper, zinc, lead, titanium, vanadium, manganese, and nickel, metal oxides and sulfides, carbon blacks (C.I. Pigment Black 7), such as furnace carbon black, lamp black, acetylene black, and channel black, and further inorganic pigments, such as ocher, ultramarine, and Prussian blue, are usable, for example.

In more detail, examples of carbon black to be used as black pigments include No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (all manufactured by Columbian Carbon Japan Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all manufactured by Cabot Corporation), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all manufactured by Degussa), and the like.

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, and the like.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, C.I. Pigment Violet 19, 23, 32, 33, 36, 38, 43 and 50, and the like.

Examples of cyan pigments include C.I. Pigment Blue 1, 2, 3, 15, 15:1, 15:2, 15:3, 15:34, 15:4, 16, 18, 22, 25, 60, 65, and 66, C.I. Vat Blue 4 and 60, and the like.

Examples of pigments other than the black, yellow, magenta, and cyan pigments include, for example, C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63, and the like.

The pigments mentioned above may be used alone or in combination of two or more thereof.

The content of the pigment contained in the pigment textile printing ink jet ink composition according to this embodiment varies depending on the pigment type to be used and is preferably 1% by mass or more and 30% by mass or less, more preferably 3% by mass or more and 15% by mass or less, and still more preferably 5% by mass or more and 13% by mass or less relative to the total mass (100% by mass) of the ink from the viewpoint of securing good color developability. Among the above, when the titanium oxide is used as the pigment contained in the ink, the content of the titanium oxide is preferably 3% by mass or more and 25% by mass or less and more preferably 5% by mass or more and 20% by mass or less relative to the total mass of the ink because the titanium oxide is hard to precipitate and has excellent concealing properties and color reproducibility on a fabric having low brightness. The content is more preferably 7% by mass or more and 15% by mass or less and still more preferably 12% by mass or less.

In preparing the pigment textile printing ink jet ink composition, a pigment dispersion liquid in which a pigment is dispersed beforehand may be prepared, and then the obtained pigment dispersion liquid may be added to and mixed with a dispersion liquid of another material. Examples of methods for obtaining such a pigment dispersion liquid include a method for dispersing a self-dispersible pigment in a dispersion medium without using a dispersant, a method for dispersing a pigment in a dispersion medium using a polymer dispersant (resin dispersant), a method for dispersing a surface-treated pigment in a dispersion medium, and the like.

Resin Dispersant

Examples of the resin dispersant include, but are not particularly limited to, polyvinyl alcohols, polyvinyl pyrrolidones, polyacrylic acids, an acrylic acid-acryl nitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methyl styrene-acrylic acid copolymer, a styrene-α-methyl styrene-acrylic acid-acrylic acid ester copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer, and the like and salts thereof, for example. Among the above, copolymers of monomers having hydrophobic functional groups and monomers having hydrophilic functional groups and polymers containing monomers having both hydrophobic functional groups and hydrophilic functional groups are particularly preferable. As the form of the copolymer, the copolymer can be used in any form of a random copolymer, a block copolymer, an alternating copolymer, and a graft copolymer.

As the resin dispersant, commercially-available items are also usable. Specifically, Joncryl 67 (weight average molecular weight: 12,500, Acid value: 213), Joncryl 678 (weight average molecular weight: 8,500, Acid value: 215), Joncryl 586 (Weight average molecular weight: 4,600, Acid value: 108), Joncryl 611 (weight average molecular weight: 8,100, Acid value: 53), Joncryl 680 (weight average molecular weight: 4,900, Acid value: 215), Joncryl 682 (weight average molecular weight: 1,700, Acid value: 238), Joncryl 683 (weight average molecular weight: 8,000, Acid value: 160), Joncryl 690 (weight average molecular weight: 16,500, Acid value: 240) (all Trade Name, manufactured by BASF Japan, LTD.), and the like are mentioned.

2.2. Resin Particle

The pigment textile printing ink jet ink composition according to this embodiment contains resin particles. The resin particles are provided with a function of improving the fixability of an image to be formed of the ink composition by forming a resin coating film, and thus can improve the washing fastness and the rubbing fastness of the image. As the resin particles, both one formed into an emulsion state and one formed into a solution state are usable and one formed into an emulsion state is preferable from the viewpoint of suppressing an ink viscosity increase.

As the resin of the resin particles, acrylic resin, styrene acrylic resin, fluorene-based resin, urethane-based resin, polyolefin-based resin, rosin-modified resin, terpene-based resin, polyester-based resin, polyamide-based resin, epoxy-based resin, vinyl chloride-based resin, a vinyl chloride-vinyl acetate copolymer, ethylene vinyl acetate-based resin, and the like are usable, for example. The resins may be used alone or in combination of two or more thereof.

As the resin of the resin particles, among the above, at least one selected from the urethane-based resin and the acrylic resin is preferably used because the degree of freedom in design is high, and thus desired physical properties are easily obtained and the urethane-based resin is more preferably used from the viewpoint of improving the rubbing fastness. The urethane-based resin may be any one of a polyether type containing an ether bond, a polyester type containing an ester bond, a polycarbonate type containing a carbonate bond, and the like. The elongation at fracture point and the 100% modulus when a urethane-based resin having a crosslinkable group is crosslinked (crosslinked object) can be adjusted by changing the density of the crosslinking point and the kind of the main chain. Among the above, the urethane-based resin having a crosslinkable group having a polycarbonate-based skeleton or a polyether-based skeleton is more preferable in the points that the balance between the elongation at fracture point and the 100% modulus is good and the rubbing fastness of an image and the texture of a printed textile are easily improved. A polycarbonate-based urethane resin having a polycarbonate-based skeleton is preferable because the polycarbonate-based urethane resin tends to be able to improve the rubbing fastness. In particular, the pigment textile printing ink jet ink composition according to this embodiment contains the nonionic fluorine-based surfactant, and therefore there is a tendency that the rubbing fastness of a printed textile to be obtained is likely to be poor. However, by the use of polycarbonate-based urethane resin particles as the resin particles, the pigment is likely to be fixed to the surface of a fabric and, even when the nonionic fluorine-based surfactant is used, a printed textile excellent in color developability and rubbing fastness is obtained.

The urethane resin is preferably the polycarbonate-based urethane resin or the like and contains a urethane resin containing a crosslinkable group, for example. As the crosslinkable group, an isocyanate group and a silanol group are mentioned and one in which an isocyanate group is chemically protected (capping or blocking) (blocked isocyanate group) is preferably used. The blocked isocyanate group is deprotected by being heated to be activated to form a bond (for example, urethane bond, urea bond, allophanate bond, and the like).

It is preferable that the urethane-based resin having a crosslinkable group has three or more crosslinkable groups in one molecule. In such a case, a crosslinking structure is formed by the reaction of the crosslinkable groups. In this specification, the urethane-based resin refers to resins containing a urethane bond, a urea bond, an allophanate bond, and the like formed by the reaction of the isocyanate group with the other reactive groups (for example, a hydroxyl group, an amino group, a urethane bond group, a carboxyl group, and the like). Therefore, a urea resin is included in the urethane-based resin in this specification, for example. The urethane-based resin is preferably a compound having a urethane bond obtained by the reaction of a compound having an isocyanate group and a compound having a hydroxyl group.

The blocked isocyanate (chemically protected isocyanate) contains a latent isocyanate group obtained by blocking the isocyanate group by a blocking agent and can be obtained by reacting a polyisocyanate compound with a blocking agent, for example.

Examples of the polyisocyanate compound include polyisocyanate monomers, polyisocyanate derivatives, and the like, for example. Examples of the polyisocyanate monomers include polyisocyanates, such as aromatic polyisocyanate, araliphatic polyisocyanate, aliphatic polyisocyanate, and alicyclic polyisocyanate, and the like, for example. The polyisocyanate monomers can be used alone or in combination of two or more thereof.

Examples of the polyisocyanate derivatives include polymers of the polyisocyanate monomers mentioned above (for example, dimer, trimer (for example, an isocyanurate modified substance and an iminooxadiazine dione modified substance), pentamer, heptamer, and the like), and allophanate modified substances (for example, allophanate modified substances and the like generated by the reaction of the polyisocyanate monomers mentioned above with low molecular weight polyols described later), polyol modified substances (for example, polyol modified substances (alcohol adduct) and the like generated by the reaction of polyisocyanate monomers with low molecular weight polyols described later), biuret modified substances (for example, biuret modified substances and the like generated by the reaction of the polyisocyanate monomers mentioned above with water or amines), urea modified substances (for example, urea modified substances and the like generated by the reaction of the polyisocyanate monomers mentioned above with diamines), oxadiazine trione modified substances (for example, oxadiazine trione and the like generated by the reaction of the polyisocyanate monomers mentioned above and carbon dioxides), carbodiimide modified substances (carbodiimide modified substances and the like generated by a decarboxylation condensation reaction of the polyisocyanate monomers mentioned above), uretdione modified substances, uretonimine modified substances, and the like, for example.

When two or more of the polyisocyanate compounds are used in combination, two or more of polyisocyanate compounds may be simultaneously reacted or blocked isocyanates obtained individually using the polyisocyanate compounds may be mixed in the production of blocked isocyanate, for example.

While the blocking agent blocks the isocyanate group to inactivate the same, the blocking agent regenerates or activates the isocyanate group after deblocking and also has a catalytic action of activating the isocyanate group in a state where the isocyanate group is blocked or deblocked.

Examples of the blocking agent include imidazole-based compounds, imidazoline-based compounds, pyrimidine-based compounds, guanidine-based compounds, alcohol-based compounds, phenol-based compounds, active methylene-based compounds, amine-based compounds, imine-based compounds, oxime-based compounds, carbamic acid-based compounds, urea-based compounds, acid amide-based (lactam-based) compounds, acid imide-based compounds, triazole-based compounds, pyrazole-based compounds, mercaptan-based compounds, bisulfites, and the like.

Examples of the imidazole-based compounds, for example, imidazole (Dissociation temperature of 100° C.), benzimidazole (Dissociation temperature of 120° C.), 2-methylimidazole (Dissociation temperature of 70° C.), 4-methylimidazole (Dissociation temperature of 100° C.), 2-ethylimidazole (Dissociation temperature of 70° C.), 2-isopropylimidazole, 2,4-dimethylimidazole, 2-ethyl-4-methylimidazole, and the like.

Examples of the imidazoline-based compounds include 2-methylimidazoline (Dissociation temperature of 110° C.), 2-phenylimidazoline, and the like, for example.

Examples of the pyrimidine-based compound include 2-methyl-1,4,5,6-tetrahydropyrimidine and the like, for example.

Examples of the guanidine-based compounds include, for example, 3,3-dialkyl guanidine, such as 3,3-dimethyl guanidine, e.g., 1,1,3,3-tetraalkyl guanidine, such as 1,1,3,3-tetramethyl guanidine (Dissociation temperature of 120° C.), 1,5,7-triazabicyclo[4.4.0]deca-5-ene, and the like.

Examples of the alcohol-based compounds include, for example, methanol, ethanol, 2-propanol, n-butanol, s-butanol, 2-ethylhexyl alcohol, 1- or 2-octanol, cyclohexyl alcohol, ethylene glycol, benzyl alcohol, 2,2,2-trifluoroethanol, 2,2,2-trichloroethanol, 2-(hydroxymethyl)furan, 2-methoxyethanol, methoxy propanol, 2-ethoxyethanol, n-propoxyethanol, 2-butoxyethanol, 2-ethoxyethoxyethanol, 2-ethoxybutoxyethanol, butoxyethoxyethanol, 2-butoxyethylethanol, 2-butoxyethoxyethanol, N,N-dibutyl-2-hydroxyacetamide, N-hydroxysuccinimide, N-morpholine ethanol, 2,2-dimethyl-1,3-dioxolane-4-methanol, 3-oxazolidine ethanol, 2-hydroxymethyl pyridine (Dissociation temperature of 140° C.), furfuryl alcohol, 12-hydroxy stearic acid, triphenyl silanol, 2-hydroxyethyl methacrylate, and the like.

Examples of the phenol-based compounds include, for example, phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphenol, isopropylcresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methylsalicylate, 4-hydroxymethylbenzoate, 4-hydroxybenzylbenzoate, 2-ethylhexyl hydroxybenzoate, 4-[(dimethylamino)methyl]phenol, 4-[(dimethylamino)methyl]nonylphenol, bis(4-hydroxyphenyl)acetate, 2-hydroxypyridine (Dissociation temperature of 80° C.), 2- or 8-hydroxyquinoline, 2-chloro-3-pyridinol, pyridine-2-thiol (Dissociation temperature of 70° C.), and the like.

Examples of the active methylene-based compounds include, for example, Meldrum's acid, dialkyl malonates (e.g., dimethyl malonate, diethyl malonate, di-n-butyl malonate, di-t-butyl malonate, di-2-ethylhexyl malonate, methyl n-butyl malonate, ethyl n-butyl malonate, methyl s-butyl malonate, ethyl s-butyl malonate, methyl t-butyl malonate, ethyl t-butyl malonate, diethyl methylmalonate, dibenzyl malonate, diphenyl malonate, benzylmethyl malonate, ethylphenyl malonate, t-butylphenyl malonate, isopropylidene malonate, and the like), alkyl acetoacetates (e.g., methyl acetoacetate, ethyl acetoacetate, n-propyl acetoacetate, isopropyl acetoacetate, n-butyl acetoacetate, t-butyl acetoacetate, benzyl acetoacetate, phenyl acetoacetate, and the like), 2-acetoacetoxyethyl methacrylate, acetylacetone, ethyl cyanoacetate, and the like.

Examples of the amine compounds include, for example, dibutylamine, diphenylamine, aniline, N-methylaniline, carbazole, bis(2,2,6,6-tetramethylpiperidinyl)amine, di-n-propylamine, diisopropylamine (Dissociation temperature of 130° C.), isopropylethylamine, 2,2,4- or 2,2,5-trimethylhexamethyleneamine, N-isopropylcyclohexylamine (Dissociation temperature of 140° C.), dicyclohexylamine (Dissociation temperature of 130° C.), bis(3,5,5-trimethylcyclohexyl)amine, piperidine, 2,6-dimethylpiperidine (Dissociation temperature of 130° C.), t-butylmethylamine, t-butylethylamine (Dissociation temperature 120° C.), t-butylpropylamine, t-butylbutylamine, t-butylbenzylamine (Dissociation temperature of 120° C.), t-butylphenylamine, 2,2,6-trimethylpiperidine, 2,2,6,6-tetramethylpiperidine (Dissociation temperature of 80° C.), (dimethylamino)-2,2,6,6-tetramethylpiperidine, 2,2,6,6-tetramethyl-4-piperidine, 6-methyl-2-piperidine, 6-aminocaproic acid, and the like.

Examples of the imine compounds include, for example, ethyleneimine, polyethyleneimine, 1,4,5,6-tetrahydropyrimidine, guanidine, and the like.

Examples of the oxime compounds include, for example, formaldoxime, acetaldoxime, acetoxime, methylethylketoxime (Dissociation temperature of 130° C.), cyclohexanoneoxime, diacetyl monoxime, benzophenone oxime, 2,2,6,6-tetramethylcyclohexanoneoxime, diisopropylketoneoxime, methyl t-butylketoneoxime, diisobutylketoneoxime, methylisobutylketoneoxime, methylisopropylketoneoxime, methyl 2,4-dimethylpentylketoneoxime, methyl 3-ethylheptylketoneoxime, methylisoamylketoneoxime, n-amylketoneoxime, 2,2,4,4-tetramethyl-1,3-cyclobutanedionemonooxime, 4,4'-dimethoxybenzophenoneoxime, 2-heptanoneoxime, and the like.

Examples of the carbamic acid compounds include, for example, phenyl N-phenyl carbamate and the like.

Examples of the urea compounds include, for example, urea, thiourea, ethylene urea, and the like.

Examples of the acid amide-based (lactam-based) compounds include, acetanilide, N-methyl acetamide, acetamide, ε-caprolactam, δ-valerolactam, γ-butyrolactam, pyrrolidone, 2,5-piperazine dione, laurolactam, and the like, for example.

Examples of the acid imide compounds include succinimide, maleinimide, phthalimide, and the like, for example.

Examples of the triazole compounds include 1,2,4-triazole, benzotriazole, and the like, for example.

Examples of the pyrazole compounds include pyrazole, 3,5-dimethylpyrazole (Dissociation temperature of 120° C.), 3,5-diisopropylpyrazole, 3,5-diphenylpyrazole, 3,5-di-t-butylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole, and the like, for example.

Examples of the mercaptan compounds include butylmercaptan, dodecylmercaptan, hexylmercaptan, and the like, for example.

Examples of the bisulfites include sodium bisulfite and the like, for example.

Examples of the blocking agent also include, for example, other blocking agents, such as benzoxazolone, isatoic acid anhydride, and tetrabutylphosphonium acetate, without being limited to the above-described examples.

For some of the compounds illustrated above, the dissociation temperature is also indicated as the temperature for regenerating the isocyanate group.

Such blocking agents can be used alone or in combination of two or more thereof. The dissociation temperature of the blocking agent can be selected as appropriate. The dissociation temperature is 60° C. or more and 230° C. or less, preferably 80° C. or more and 200° C. or less, more preferably 100° C. or more and 180° C. or less, and still more preferably 110° C. or more and 160° C. or less, for example. Within such a temperature range, the pot life of the pigment textile printing ink jet ink composition can be sufficiently lengthened and the temperature in a heating process can be prevented from being excessively high.

The main chain of the urethane-based resin having a crosslinkable group may be any one of a polyether type containing an ether bond, a polyester type containing an ester bond, and a polycarbonate type containing a carbonate bond. The elongation at fracture point and the 100% modulus when the urethane-based resin having a crosslinkable group is crosslinked (crosslinked object) can be adjusted by changing the density of the crosslinking point and the kind of such a main chain. Among the above, a urethane-based resin having a crosslinkable group having a polycarbonate-based skeleton or a polyether-based skeleton is more preferable in the points that the balance between the elongation at fracture point and the 100% modulus is good and the rubbing fastness of an image and the texture of a printed textile are easily improved. The polycarbonate-based urethane resin having a polycarbonate-based skeleton is preferable because the polycarbonate-based urethane resin tends to be able to improve the rubbing fastness. In particular, the pigment textile printing ink jet ink composition according to this embodiment contains the nonionic fluorine-based surfactant, and therefore there is a tendency that the rubbing fastness of a printed textile to be obtained is likely to be poor. However, by the use of polycarbonate-based urethane resin particles as the resin particles, the pigment is likely to be fixed to the surface of a fabric and, even when the nonionic fluorine-based surfactant is used, a printed textile excellent in color developability and rubbing fastness is obtained.

The urethane-based resin having a crosslinkable group has an elongation at fracture point after crosslinked (crosslinked object) of 150% or more, preferably 170% or more, more preferably 200% or more, and still more preferably 300% or more. By selecting the density of the crosslinking point and the kind of the main chain so as to have such an elongation at fracture point, the texture of a printed textile can be improved.

Herein, as the elongation at fracture point, a value obtained by curing a urethane-based resin emulsion having a crosslinkable group to create a film having a thickness of approximately 60 µm, and then performing the measurement under the conditions of the tensile test gauge length of 20 mm and the tensile speed of 100 mm/min can be adopted, for example. For the 100% modulus, a value obtained by measuring the tensile stress when the film is 100% elongated relative to the original length in the tensile test can be adopted. The film to be measured may be formed using the urethane-based resin emulsion having a crosslinkable group or may be formed by molding using the same kind of resin, and the formation using an emulsion resin is preferable.

The urethane-based resin having a crosslinkable group may be compounded in the form of an emulsion. Such a resin emulsion is a so-called self-reaction type urethane-based resin emulsion and those commercially available as a urethane-based resin emulsion having an isocyanate group blocked by a blocking agent having a hydrophilic group are usable.

As the commercially-available items of the urethane-based resin having a crosslinkable group, TAKELAC WS-6021 (Trade Name, manufactured by Mitsui Chemicals & SKC Polyurethanes Inc., urethane-based resin emulsion, polyether-based polyurethane having a polyether-derived skeleton), WS-5100 (Trade Name, manufactured by Mitsui Chemicals & SKC Polyurethanes Inc., urethane-based resin emulsion, polycarbonate-based polyurethane having a polycarbonate-derived skeleton), Elastron E-37 and H-3 (polyester-based polyurethane, the main chain of which has a polyester-derived skeleton), Elastron H-38, BAP, C-52, F-29, and W-11P (polyether-based polyurethane, the main chain of which has a polyether-derived skeleton) (Trade Names, manufactured by DKS Co., Ltd. urethane-based resin emulsion), SUPERFLEX 870, 800, 150, 420, 460, 470, 610, and 700 (Trade Names, manufactured by DKS Co., Ltd., urethane-based resin emulsion), PERMARIN UA-150 (Trade Name, manufactured by Sanyo Chemical Industries, Ltd., urethane-based resin emulsion), Sancure 2710 (Trade Name, manufactured by Lubrizol Japan Ltd., urethane-based resin emulsion), NeoRez R-9660, R-9637, and R-940 (Trade Names, manufactured by Kusumoto Chemicals, Ltd., urethane-based resin emulsion), ADEKA BONTIGHTER HUX-380 and 290K (Trade Names, manufactured by ADEKA Corporation, urethane-based resin emulsion) and the like can be illustrated.

In this embodiment, the content of the resin particles is preferably 1% by mass or more and 20% by mass or less in terms of solid content relative to the total mass (100% by mass) of the ink and the lower limit is more preferably 2.5% by mass or more and still more preferably 3% by mass or more. The upper limit of the content of the resin particles is more preferably 15% by mass or less and still more preferably 12% by mass or less. By setting the content of the resin particles within the range mentioned above, both the discharge stability and the rubbing fastness of a recorded matter to be obtained can be achieved.

When a treatment liquid is used in the ink jet pigment textile printing method according to this embodiment described later, the urethane-based resins may be contained in the treatment liquid. In that case, the urethane-based resin contained in the treatment liquid may be the same as or different from the urethane-based resin contained in the pigment textile printing ink jet ink composition.

The temperature in a heating process in the ink jet pigment textile printing method according to this embodiment described later is set considering the deprotection temperature (dissociation temperature) of the isocyanate group of the urethane-based resins having a crosslinkable groups so that at least some of the crosslinkable groups are activated.

2.3. Nonionic Fluorine-Based Surfactant

The pigment textile printing ink jet ink composition according to this embodiment contains a nonionic fluorine-based surfactant. In the pigment textile printing ink jet ink composition according to this embodiment, the permeation of the ink into the fabric is suppressed, and thus the sinking into the fabric of the pigment is suppressed by an operation of holding the ink on the surface of the fabric by the nonionic fluorine-based surfactant. Due to the fact that the surfactant is nonionic, unevenness is hard to occur in color development. Therefore, due to the fact that the pigment textile printing ink jet ink composition according to this embodiment contains the nonionic fluorine-based surfactant, a printed textile excellent in color developability can be obtained.

When the pigment textile printing ink jet ink composition according to this embodiment is used for the two-layer printing, blurring of a color boundary with a chromatic color ink (hereinafter also referred to as "color ink") to be printed later decreases by reducing the wettability of the surface of a white base formed of a white ink containing a white pigment as the pigment of the pigment textile printing ink jet ink composition, and therefore the color developability of the chromatic color ink is improved.

When selecting the nonionic fluorine-based surfactant, it is preferable to take the HLB value into consideration. More specifically, the lower limit of the HLB value of the nonionic fluorine-based surfactant compounded in the pigment textile printing ink jet ink composition is 6 or more, preferably 8 or more, and more preferably 10 or more. The upper limit of the HLB value of the nonionic fluorine-based surfactant is 15 or less, preferably 13 or less, and more preferably 12 or less. The nonionic fluorine-based surfactant having an HLB value within the range mentioned above has a higher hydrophilicity and more easily suppresses the permeability into a fabric of the pigment textile printing ink jet ink composition. Therefore, the color developability can be further improved.

The HLB value in this specification is a value calculated by the following expression (1) from the ratio of a nonpolar value (I) and a polar value (O) in an organic conceptual diagram (hereinafter also simply referred to as "I/O value").

$$HLB \text{ value} = (\text{Nonpolar value } (I)/\text{Polar value } (O)) \times 10 \qquad (1)$$

Specifically, the I/O value can be calculated based on each of the literatures of "Keitoteki Yuki Teisei Bunseki Kongobutsu Hen" (Systematic Qualitative Organic Analysis (Mixtures)), edited by Atsushi FUJITA, Kazama shobo, 1974; "Senshoku Riron Kagaku" (Dyeing Theory Science), edited by Nobuhiko KUROKI, Maki Shoten, 1966; and "Yuki Kagobutsu Bunriho" (Separation Method for Organic Compounds), edited by Hiroo INOUE, Shokabo Co., Ltd., 1990.

The nonionic fluorine-based surfactant preferably has a polyoxyethylene group and an alkyl fluoride group, and a polyfluoroalkylamine oxide or a polyfluoroalkyl-alkylene oxide adduct is preferable.

As the nonionic fluorine-based surfactant to be used in this embodiment, commercially available substances are usable and Surflon S-145, Surflon S-241, Surflon S-242, Surflon S-243, Surflon S-386, Surflon S-393, Surflon S-420, Surflon S-611, Surflon S-650, Surflon S-651, Surflon KH-20, and Surflon KH-40 (all Trade Names, manufactured by AGC SEIMI CHEMICAL CO., LTD.), Fluorad FC-170C, Fluorad FC-430, and Fluorad FC4430 (all Trade Names, manufactured by Sumitomo 3M Japan, Inc.), FSO, FSO-100, FSN, FSN-100, and FS-300 (all Trade Names, manufactured by DuPont), Ftergent FT-250 and 251 (all Trade Names, manufactured by Neos Co., Ltd.), Megaface F-554 and Megaface F-556 (all Trade Names, manufactured by DIC Corporation), and the like are mentioned. Among the above, FSO, FSO-100, FSN, FSN-100, and FS-300 of DuPont are preferably used. By the use of the nonionic fluorine-based surfactants, the permeability into a fabric of the pigment textile printing ink jet ink composition can be controlled, so that the color developability of a printed textile can be further improved. When the pigment textile printing ink jet ink composition according to this embodiment is used for the two-layer printing, the blurring of a color boundary with a chromatic color ink printed later decreases by reducing the wettability of the surface of a white base formed of a white ink, so that the color developability of the chromatic color ink is improved.

The lower limit of the content of the nonionic fluorine-based surfactant of the pigment textile printing ink jet ink composition according to this embodiment is preferably 0.1% by mass or more, more preferably 0.2% by mass or more, and still more preferably 0.3% by mass or more relative to the total mass (100% by mass) of the pigment textile printing ink jet ink composition. The upper limit of the content of the nonionic fluorine-based surfactant is preferably 3% by mass or less, more preferably 1.5% by mass or less, still more preferably 0.8% by mass or less, yet still more preferably 0.6% by mass or less, and even yet still more preferably 0.5% by mass or less relative to the total mass (100% by mass) of the pigment textile printing ink jet ink composition. Due to the fact that the content of the nonionic fluorine-based surfactant is within the range mentioned above, the permeability into the fabric of the pigment textile printing ink jet ink composition can be controlled, so that the color developability of a printed textile can be further improved. When the pigment textile printing ink jet ink composition according to this embodiment is used for the two-layer printing, the blurring of a color boundary with a chromatic color ink printed later decreases by reducing the wettability of the surface of a white base formed of a white ink, so that the color developability of the chromatic color ink is improved.

In the case of using the pigment textile printing ink jet ink composition according to this embodiment for the two-layer printing, when a white ink composition containing a white pigment is used as a base layer by being applied and a chromatic color pigment textile printing ink jet ink composition is used by being applied onto the base layer, for example, the content of the nonionic fluorine-based surfactant in the chromatic color pigment textile printing ink jet ink composition is preferably 0.5% by mass or less, more preferably 0.3% by mass or less, and still more preferably 0.1% by mass or less relative to the total mass (100% by mass) of the chromatic color pigment textile printing ink jet ink composition, and yet still more preferably the nonionic fluorine-based surfactant is not contained. Due to the fact that the content of the nonionic fluorine-based surfactant in the chromatic color pigment textile printing ink jet ink composition is within such a range, a reduction in rubbing fastness of a printed textile to be obtained is suppressed in the two-layer printing, so that an image with good abrasion resistance is obtained.

2.4. Water

The pigment textile printing ink jet ink composition according to this embodiment contains water as a solvent.

The water is a medium serving as the main component of the ink and is a component evaporating and scattering by drying. As the water, those from which ionic impurities are removed as much as possible, such as pure water and ultrapure water, e.g., ion exchanged water, ultrafiltration water, reverse osmosis water, and distilled water, are mentioned, for example. When water sterilized by irradiation with ultraviolet rays or the addition of hydrogen peroxide, for example, is used, the generation of molds or bacteria can be prevented when the ink is stored over a long period of time.

The content of the water contained in the pigment textile printing ink jet ink composition according to this embodiment is not particularly limited and can be 50% by mass or more, can be 60% by mass or more, or can be 70% by mass or more relative to the total mass (100% by mass) of the ink. The upper limit of the content of the water contained in the ink can be 95% by mass or less, can be 90% by mass or less, and can be 80% by mass or less.

2.5. Water-Soluble Organic Solvent

The pigment textile printing ink jet ink composition according to this embodiment may also contain a water-soluble organic solvent. Due to the fact that the water-soluble organic solvent is contained, the discharge stability by an ink jet method of the ink composition is improved and the moisture evaporation from an ink jet head when allowed to stand over a long period of time can be effectively suppressed.

Examples of the water-soluble organic solvent include polyol compounds, glycol ethers, betaine compounds, and the like, for example.

As the polyol compounds, polyol compounds (preferably diol compounds) in which the number of carbon atoms in the molecules is 2 or more and 6 or less and which may have one ether bond in the molecules are mentioned, for example. Specific examples of the polyol compounds include glycols, such as 1,2-pentanediol, methyl triglycol (triethylene glycol monomethyl ether), butyl triglycol (triethylene glycol monobutyl ether), butyl diglycol (diethylene glycol monobutyl ether), dipropylene glycol monopropyl ether, glycerol, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxy methyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol.

As the glycol ethers, monoalkyl ethers of glycols selected from ethylene glycol, diethylene glycol, triethylene glycol, polyethylene glycols, propylene glycol, dipropylene glycol, tripropylene glycol, polypropylene glycol, and polyoxyethylene polyoxy propylene glycol are preferable, for example. More preferably, triethylene glycol monomethyl ether, triethylene glycol monobutyl ether, dipropylene glycol monopropyl ether, and the like are mentioned.

The betaine compounds are compounds (intramolecular salts) which have positive charges and negative charges at positions which are not adjacent to each other in the same molecule, in which a hydrogen atom which can be dissociated is not bonded to an atom having a positive charge, and which have no charges as whole molecules. The betaine compounds are preferably N-alkyl substitution products of amino acids and more preferably N-trialkyl substitution products of amino acids. As the betaine compounds, trimethyl glycine (also referred to as "glycine betaine"), γ-butyro betaine, homarine, trigonelline, carnitine, homoserine betaine, valine betaine, lysine betaine, ornithine betaine, alanine betaine, stachydrine, glutamic acid betaine, and the like are mentioned, and trimethyl glycine and the like can be preferably illustrated, for example.

As the water-soluble organic solvent, pyrrolidone derivatives may be used. Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like, for example.

For the water-soluble organic solvent, two or more may be mixed to be used. The water-soluble organic solvent is preferably added so as to achieve desired ink viscosity and surface tension described later. The content of the water-soluble organic solvent is 0.2% by mass or more and 30% by mass or less, preferably 0.4% by mass or more and 20% by mass or less, more preferably 0.5% by mass or more and 15% by mass or less, and still more preferably 0.7% by mass or more and 10% by mass or less relative to the total mass (100% by mass) of the ink.

2.6. Inorganic Alkali Compound

The pigment textile printing ink jet ink composition according to this embodiment preferably contains an inorganic alkali compound (inorganic base compound). The inorganic alkali compound has a property of increasing the pH of the pigment textile printing ink jet ink composition. The inorganic alkali compound has at least a function of increasing the dispersion stability of resin particles and/or a function of improving the redispersibility of resin particles.

Examples of the inorganic alkali compound include hydroxides of alkali metals or hydroxides of alkaline earth metals, carbonates of alkali metals or carbonates of alkaline earth metals, phosphates of alkali metals or phosphates of alkaline earth metals, and the like.

Examples of the hydroxides of alkali metals include lithium hydroxide, sodium hydroxide, potassium hydroxide, and the like. Examples of the hydroxide of alkaline earth metals include calcium hydroxide, magnesium hydroxide, and the like.

Examples of the carbonates of alkali metals include lithium carbonate, lithium hydrogencarbonate, potassium carbonate, potassium hydrogencarbonate, sodium carbonate, sodium hydrogencarbonate, and the like. Examples of the carbonates of alkaline earth metals include calcium carbonate and the like.

Examples of the phosphates of alkali metals include lithium phosphate, potassium phosphate, potassium dihydrogen phosphate, trisodium phosphate, disodium hydrogen phosphate, and the like. Examples of the phosphates of alkaline earth metals include calcium phosphate, calcium hydrogen phosphate, and the like.

For the pigment textile printing ink jet ink composition according to this embodiment, two or more of the inorganic alkali compounds mentioned above may be used. The total content of the inorganic alkali compound is 0.01% by mass or more and 0.8% by mass or less, preferably 0.02% by mass or more and 0.6% by mass or less, more preferably 0.03% by mass or more and 0.4% by mass or less, still more preferably 0.04% by mass or more and 0.3% by mass or less, particularly preferably 0.05% by mass or more and 0.2% by mass or less, and more particularly preferably 0.05% by mass or more and 0.1% by mass or less relative to the total mass (100% by mass) of the pigment textile printing ink jet ink composition.

When the compounding amount of the inorganic alkali compound is within the range mentioned above, the pH of the pigment textile printing ink jet ink composition can be sufficiently increased and the function of increasing the dispersion stability of resin particles and/or the function of improving the redispersibility of resin particles can be demonstrated.

2.7. Other Components

The pigment textile printing ink jet ink composition according to this embodiment may contain surfactants other than the nonionic fluorine-based surfactant, pH adjusters, antiseptic agents, antifungal agents, antirusts, chelating agents, viscosity modifiers, dissolution assistants, antioxidants, and the like as necessary.

Surfactant

The pigment textile printing ink jet ink composition according to this embodiment may also contain surfactants other than the nonionic fluorine-based surfactant to such an extent that operations of the nonionic fluorine-based surfactant are not affected. As the surfactants other than the nonionic fluorine-based surfactant, anionic surfactants, cationic surfactants, and amphoteric surfactants are all usable and may be used in combination. These surfactants can reduce the interfacial tension of the ink composition and improve the permeability into a fabric and also increases the stability in discharging the ink from a head in some cases.

PH Adjuster

Examples of the pH adjusters include morpholines, piperazines, amines having a normal boiling point at 25° C. of 200° C. or more, such as diethanolamine, triethanolamine, and triisopropanolamine, ammonia, and the like besides the inorganic alkali compounds described above, for example. Among the above, the amines having a normal boiling point at 25° C. of 200° C. or more are preferably contained. Due to the fact that such high boiling point amines are contained, clogging of a head can be suppressed at a temperature in a heating process in the ink jet pigment textile printing method according to this embodiment described later. Antiseptic agent and antifungal agent Examples of the antiseptic agents and the antifungal agents include sodium benzoate, sodium pentachlorophenol, sodium 2-pyridinethiol-1-oxide, sodium sorbate, sodium dehydroacetate, 1,2-dibenzine thiazoline-3-one (Proxel CRL, Proxel BND, Proxel GXL, Proxel XL-2, and Proxel TN of ICI), and the like.

Chelating Agent

The chelating agent has a property of capturing ions. Examples of such a chelating agent include ethylenediaminetetraacetate (EDTA), nitrilotriacetate, hexametaphosphate, pyrophosphate, or metaphosphate of ethylene diamine, and the like, for example.

2.8. Method for Preparing Pigment Textile Printing Ink Jet Ink Composition

The pigment textile printing ink jet ink composition according to this embodiment is obtained by mixing the components mentioned above in an arbitrary order, and then performing filtration or the like as necessary to remove impurities. As a method for mixing the components, a method including successively adding materials into a container provided with a stirring device, such as a mechanical stirrer or a magnetic stirrer, and then stirring and mixing the components is preferably used. As a filtration method, centrifugal filtration, filter filtration, and the like can be performed as necessary.

2.9. Physical Properties of Pigment Textile Printing Ink Jet Ink Composition The pigment textile printing ink jet ink composition according to this embodiment is applied to a fabric by an ink jet method. Therefore, in the pigment textile printing ink jet ink composition, the surface tension at 25° C. is preferably 10 mN/m or more and 40 mN/m or less and more preferably 25 mN/m or more and 40 mN/m or less from the viewpoint of the balance between the recording quality and the reliability as an ink for ink jet recording. For the measurement of the surface tension, the measurement can be performed by confirming the surface tension when a platinum plate is wetted with an ink in a 25° C. environment using an automatic surface tensiometer CBVP-Z (Trade Name, manufactured by Kyowa Interface Science Co., LTD.), for example.

From the same viewpoint, the viscosity at 20° C. of the pigment textile printing ink jet ink composition is preferably 2 mPa·s or more and 15 mPa·s or less, more preferably 2 mPa·s or more and 5 mPa·s or less, and more preferably 2 mPa·s or more and 3.6 mPa·s or less. For the measurement of the viscosity, the viscosity in a 40° C. or 20° C. environment can be measure using a viscoelasticity testing machine MCR-300 (Trade Name, manufactured by Pysica), for example.

2.10. Operations and Effects

As described above, the pigment textile printing ink jet ink composition according to this embodiment suppresses the permeation of the ink into a fabric to suppress the sinking into the fabric of the pigment by an operation of holding the ink on the surface of the fabric by the nonionic fluorine-based surfactant. Due to the fact that the surfactant is nonionic, unevenness is hard to occur in color development. Thus, due to the fact that the nonionic fluorine-based surfactant is contained, the permeation of the ink into a fabric is controlled, so that a printed textile excellent in color developability and particularly white color developability is obtained. Moreover, the pigment textile printing ink jet ink composition set containing the pigment textile printing ink jet ink composition according to this embodiment provides a printed textile excellent in color developability in two-layer printing of performing pigment textile printing using the pigment textile printing ink jet ink composition, and further performing pigment textile printing using an ink containing a chromatic color pigment.

3. TREATMENT LIQUID COMPOSITION

The pigment textile printing ink jet ink composition set according to this embodiment preferably contains a treatment liquid composition in order to further improve the color developability besides the white pigment textile printing ink jet ink composition and the chromatic color pigment textile printing ink jet ink composition described above.

The treatment liquid composition to be used in this embodiment coagulates the components of the ink composition and is preferably used for an ink jet pigment textile printing method performed by attaching the pigment textile printing ink jet ink composition according to this embodiment to a fabric by an ink jet method. More specifically, the treatment liquid composition to be used in this embodiment is attached to a fabric, and thereafter the pigment textile printing ink jet ink composition according to this embodiment is attached to the fabric by an ink jet method to perform textile printing of the fabric. Hereinafter, the treatment liquid composition to be used in this embodiment is described.

3.1. Coagulant

Examples of coagulants contained in such a treatment liquid composition include polyvalent metal salts, organic acids, and cationic compounds (cationic resin, cationic surfactant, and the like), for example. The coagulants may be used alone or in combination of two or more thereof. Among the coagulants, at least one selected from the group consisting of polyvalent metal salts and organic acids is preferably used and the polyvalent metal salts are more preferably used from the viewpoint of excellent reactivity with the pigment and the resin particles contained in the ink composition.

The polyvalent metal salts are compounds containing polyvalent metal ions of divalent or more and anions bonded to the polyvalent metal ions and are soluble in water. Specific examples of the polyvalent metal ions include divalent metal ions, such as $Ca^{2+}$, $Cu^{2+}$, $Ni^{2+}$, $Mg^{2+}$, $Zn^{2+}$, and $Ba^{2+}$, and trivalent metal ions, such as $Al^{3+}$, $Fe^{3+}$, and $Cr^{3+}$. Examples of anions include $Cl^-$, $I^-$, $Br^-$, $SO_4^{2-}$, $ClO^{3-}$, $NO^{3-}$, $HCOO^-$, $CH_3COO^-$, and the like. Among such polyvalent metal salts, calcium salts and magnesium salts are preferable and either calcium nitrate or calcium chloride is preferable from the viewpoint of the stability of the treatment liquid and the reactivity as the coagulant.

As the organic acids, sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridinecarboxylic acid, coumaric acid, thiophene carboxylic acid, nicotinic acid, or derivatives of these compounds or salts thereof and the like are preferably mentioned, for example. The organic acids may be used alone or in combination of two or more thereof.

Examples of the cationic resin include cationic urethane resin, cationic olefin resin, cationic allylamine resin, and the like, for example.

As the cationic urethane resin, known substances can be selected and used as appropriate. As the cationic urethane resin, commercially-available items are usable and, for example, HYDRAN CP-7010, CP-7020, CP-7030, CP-7040, CP-7050, CP-7060, and CP-7610 (Trade Names, manufactured by Dainippon Ink and Chemicals, Incorporated), SUPERFLEX 600, 610, 620, 630, 640, and 650 (Trade Names, manufactured by DKS Co., Ltd.), urethane emulsions WBR-2120C and WBR-2122C (Trade Names, manufactured by TAISEI FINE CHEMICAL CO., LTD.), and the like are usable.

The cationic olefin resin has olefins, such as ethylene and propylene, in the structure skeleton and known substances can be selected and used as appropriate. The cationic olefin resin may be in an emulsion state of being dispersed in a solvent containing water, an organic solvent, and the like. As the cationic olefin resin, commercially-available items are usable and, for example, Arrow Base CB-1200 and CD-1200 (Trade Names, manufactured by a UNITIKA LTD.) and the like are mentioned.

As the cationic allylamine resin, known substances can be selected and used as appropriate and, for example, polyallylamine hydrochloride, polyallylamine amide sulfate, an allylamine hydrochloride-diallylamine hydrochloride copolymer, an allylamine acetate-diallylamine acetate copolymer, an allylamine acetate-diallylamine acetate copolymer, an allylamine hydrochloride-dimethyl allylamine hydrochloride copolymer, an allylamine-dimethyl allylamine copolymer, polydiallylamine hydrochloride, polymethyl diallylamine hydrochloride, polymethyl diallylamine amide sulfate, polymethyl diallylamine acetate, polydiallyl dimethyl ammonium chloride, a diallylamine acetate-sulfur dioxide copolymer, a diallyl methyl ethylammonium ethylsulfate-sulfur dioxide copolymer, a methyl diallylamine hydrochloride-sulfur dioxide copolymer, a diallyl dimethyl ammonium chloride-sulfur dioxide copolymer, a diallyl dimethyl ammonium chloride-acryl amide copolymer, and the like can be mentioned. As such a cationic allylamine-based resin, commercially available items are usable and, for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-Dll-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (Trade Names, manufactured by NITTOBO MEDICAL CO., LTD.), Himo Neo-600, Himoloc Q-101, Q-311, and Q-501, Himax SC-505 and SC-505 (Trade Names, manufactured by HYMO Co., Ltd.), and the like are usable.

Examples of the cationic surfactants include primary, secondary, and tertiary amine salt-type compounds, alkylamine salts, dialkylamine salts, aliphatic amine salts, benzalkonium salts, quaternary ammonium salts, quaternary alkylammonium salts, alkyl pyridinium salts, sulfonium salts, phosphonium salts, onium salts, imidazolinium salts, and the like. Specific examples of the cationic surfactants include hydrochlorides, acetates, and the like of laurylamine, palm amine, rosin amine, and the like, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyllauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The content of the coagulant may be 0.1% by mass or more and 25% by mass or less, may be 0.2% by mass or more and 20% by mass or less, and may be 0.3% by mass or more and 10% by mass or less relative to the total mass (100% by mass) of the treatment liquid, for example. The concentration of the coagulant may be 0.03 mol/kg or more in 1 kg of the treatment liquid. The concentration of the coagulant may be 0.1 mol/kg or more and 1.5 mol/kg or less and may be 0.2 mol/kg or more and 0.9 mol/kg or less in 1 kg of the treatment liquid.

3.2. Water

The treatment liquid to be used in this embodiment preferably contains water as the main solvent. The water is a component evaporating and scattering by drying after the treatment liquid is attached to a recording medium. As the water, the same water illustrated in the ink described above is usable, and therefore the illustration thereof is omitted. The content of the water contained in the treatment liquid can be set to 50% by mass or more, preferably 60% by mass or more, more preferably 70% by mass or more, and still more preferably 80% by mass or more, for example, relative to the total mass (100% by mass) of the treatment liquid.

3.3. Water-Soluble Organic Solvent

To the treatment liquid to be used in this embodiment, a water-soluble organic solvent may be added. By adding the water-soluble organic solvent, the wettability of the treatment liquid to a recording medium can be improved. As the water-soluble organic solvent, the same organic solvents illustrated in the ink composition are usable. The content of the water-soluble organic solvent is not particularly limited and can be set to 1% by mass or more and 40% by mass or less, for example, relative to the total mass (100% by mass) of the treatment liquid.

3.4. Surfactant

To the treatment liquid to be used in this embodiment, a surfactant may be added. By adding the surfactant, the surface tension of the treatment liquid can be reduced and the wettability with a recording medium can be improved. Among surfactants, acetylene glycol-based surfactants, silicon-based surfactants, and fluorine-based surfactants can be preferably used, for example. As specific examples of the surfactants, the same surfactants illustrated in the ink composition described above are usable. The content of the surfactant is not particularly limited and can be set to 0.1% by mass or more and 1.5% by mass or less relative to the total mass (100% by mass) of the treatment liquid.

3.5. Resin Particles

To the treatment liquid to be used in this embodiment, resin particles (resin emulsion) can be compounded for the purpose of improving the rubbing fastness and suppressing fluffing of a fabric. Moreover, the color developability is also improved by containing the resin particles. As such resin particles, commercially-available items are usable. For example, in the case of a urethane resin, SUPERFLEX 500, 6E-2000, E-2500, E-4000, and R-5000 (Trade Names, manufactured by DKS Co., Ltd.) and ADEKA BONTIGHTER HUX-822 and 830 (Trade Names, manufactured by ADEKA Corporation) are mentioned. Examples of the vinyl acetate resin include Vinyblan 1245L, 2680, 2682, and 2684 (Trade Names, manufactured by Nisshin Chemical Co., Ltd.), for example. Examples of the acrylic resin include, for example, VONCOAT AN-402, R-3310, and R-3360 (Trade Names, manufactured by Dainippon Ink, Inc.).

The lower limit of the content of the resin particles in the treatment liquid is preferably 1% by mass or more, more preferably 3% by mass or more, and still more preferably 5% by mass or more relative to the total mass (100% by mass) of the treatment liquid composition for the ink jet pigment textile printing. The upper limit of the content of the resin particles is preferably 12% by mass or less, more preferably 10% by mass or less, and still more preferably 8% by mass or less relative to the total mass (100% by mass) of the treatment liquid composition for the ink jet pigment textile printing. Due to the fact that the content of the resin particles in the treatment liquid is within the range mentioned above, the rubbing fastness can be further improved and the fluffing of a fabric can be suppressed.

In the treatment liquid composition for the ink jet pigment textile printing according to this embodiment, the resin particles are preferably nonionic or cationic resin particles. When the resin particles are nonionic resin particles, a printed textile excellent in color developability and rubbing fastness is obtained particularly in the textile printing to cotton. When the resin particles are cationic resin particles, a printed textile excellent in color developability and rubbing fastness is obtained particularly in the textile printing to a fabric containing polyester or polyester mixed yarn.

3.6. Other Components

To the treatment liquid to be used in this embodiment, pH adjusters, antiseptic agents, antifungal agents, antirusts, chelating agents, and the like may be added as necessary. As the other components, the same substances illustrated in the ink composition described above are usable.

3.7. Method for Preparing Treatment Liquid

The treatment liquid to be used in this embodiment can be produced by dispersing and mixing the above-described components by a suitable method. The above-described components are sufficiently stirred, and then filtration is performed in order to remove coarse particles and foreign substances causing clogging, whereby a target treatment liquid can be obtained.

3.8. Physical Properties of Treatment Liquid

When discharged by an ink jet recording head, the treatment liquid to be used in this embodiment has a surface tension at 20° C. of preferably 20 mN/m or more and 40 mN/m or less and more preferably 20 mN/m or more and 35 mN/m or less. For the measurement of the surface tension, the measurement can be performed by, for example, confirming the surface tension when a platinum plate is wetted with an ink in a 20° C. environment using an automatic surface tensiometer CBVP-Z (Trade Name, manufactured by Kyowa Interface Science Co., LTD.).

From the same viewpoint, the viscosity at 20° C. of the treatment liquid to be used in this embodiment is preferably 3 mPa·s or more and 10 mPa·s or less and more preferably 3 mPa·s or more and 8 mPa·s or less. For the measurement of the viscosity, the viscosity in a 20° C. environment can be measured using a viscoelasticity testing machine MCR-300 (Trade Name, manufactured by Pysica), for example.

4. FABRIC

The ink jet pigment textile printing method according to this embodiment is performed using a fabric. Raw materials configuring the fabric are not particularly limited and, for example, natural fibers, such as cotton, hemp, wool, and silk, synthetic fibers, such as polypropylene, polyester, acetate, triacetate, polyamide, and polyurethane, and biodegradable fibers, such as polylactic acid, and the like are mentioned, and mixed fibers thereof may be acceptable. The fabric may be one obtained by forming the fibers mentioned above into any form of textiles, knit fabrics, nonwoven fabrics, and the like. The mass per unit area of the fabric to be used in this embodiment is also not particularly limited and is within the range of 1.0 oz (ounce) or more and 10.0 oz or less, preferably 2.0 oz or more and 9.0 oz or less, more preferably 3.0 oz or more and 8.0 oz or less, and still more preferably 4.0 oz or more and 7.0 oz or less. When the mass per unit area of the fabric is within such a range, good recording (textile printing) can be performed. Furthermore, the ink jet pigment textile printing method according to this embodiment is applicable to a plurality of kinds of fabrics different in mass per unit area and can achieve good recording.

In this embodiment, the fabric can be a fabric containing polyester or polyester mixed yarn. Examples of such a fabric include a polyester fabric and a polyester mixed fabric, for example. Examples of the polyester mixed fabric include a fabric in which polyester is mixed in a proportion of 20% by mass or more, preferably 50% by mass or more, and more preferably 70% by mass or more, for example. The other mixed fibers are not limited and cotton is mentioned. Such a polyester containing fabric is excellent in the fact that the moisture, such as sweat, is easy to dry but, on the other hand, the ink easily sinks downward in the ink jet textile printing, so that the pigment or the resin is hard to be fixed. In this embodiment, the textile printing is performed using the pigment textile printing ink jet ink composition containing the nonionic fluorine-based surfactant described above, and therefore excellent color developability is achieved also in the pigment textile printing to the fabric containing polyester or polyester mixed yarn in which the ink easily sinks downward.

5. INK JET PIGMENT TEXTILE PRINTING METHOD

Next, the ink jet pigment textile printing method according to this embodiment is described for each process. The ink jet pigment textile printing method according to this embodiment includes attaching the pigment textile printing ink jet ink composition according to this embodiment to a fabric, and then attaching the chromatic color pigment textile printing ink jet ink composition containing a chromatic color pigment, resin particles, and water to the fabric on a region where the pigment textile printing ink jet ink composition is attached.

5.1. Treatment Liquid Composition Attachment Process

The ink jet pigment textile printing method according to this embodiment preferably includes a treatment liquid composition attachment process of attaching a treatment liquid composition coagulating the components of the ink composition before attaching the ink to a fabric in order to improve the color development of a printed textile.

As the treatment liquid composition to be attached to a fabric, the above-described treatment liquid composition is usable. The treatment liquid composition is preferably attached so that the attachment amount is 0.02 g/cm$^2$ or more and 0.5 g/cm$^2$ or less and more preferably attached so that the attachment amount is 0.02 g/cm$^2$ or more and 0.24 g/cm$^2$ or less, for example. By setting the attachment amount of the treatment liquid composition within the range mentioned above, the treatment liquid composition is easily uniformly applied to a fabric, the coagulation unevenness of an image can be suppressed, and the color development can be improved.

In the treatment liquid composition attachment process, when the treatment liquid composition contains a polyvalent metal salt, the treatment liquid composition is preferably attached to a fabric so that the attachment amount of the polyvalent metal salt contained in the treatment liquid composition attached to the fabric is 1.6 µmol/cm$^2$ or more and 6 µmol/cm$^2$ or less and more preferably attached to a fabric so that the attachment amount is 2 µmol/cm$^2$ or more and 5 µmol/cm$^2$ or less. By attaching the treatment liquid composition so that the attachment amount of the polyvalent metal salt is 1.6 µmol/cm$^2$ or more, the color developability of an image to be recorded is improved. By attaching the treatment liquid composition so that the attachment amount of the polyvalent metal salt is 6 µmol/cm$^2$ or less, the rubbing fastness of an image to be recorded is improved.

Examples of methods for attaching the treatment liquid composition to a fabric include, for example, a method for dipping a fabric into the treatment liquid composition (dip coating), a method for applying the treatment liquid composition by a roll coater or the like (roller coating), a method for ejecting the treatment liquid composition with a spray device or the like (spray coating), a method for ejecting the treatment liquid composition with an ink jet system (ink jet coating), and the like and any method may be used. Herein, when the ink jet textile printing is performed using the printer 1 illustrated in FIGURE, the treatment liquid composition is preferably attached to the fabric M from the ink jet head 2 by the ink jet coating. When the treatment liquid composition attachment process is performed by the ink jet coating, the treatment liquid composition can be more uniformly attached to the fabric M.

The ink jet pigment textile printing method according to this embodiment may include a treatment liquid composition drying process of drying the treatment liquid composition attached to a fabric after the treatment liquid composition attachment process. Although the drying of the treatment liquid composition may be performed by natural drying, drying accompanied by heating is preferable from the viewpoint of an improvement of drying speed. When the drying process of the treatment liquid composition involves heating, a heating method is not particularly limited and, for example, a heat press method, a normal pressure steam method, a high pressure steam method, and a thermofix method are mentioned. Examples of the heat source of the heating include infrared rays (lamp), for example.

5.2. Ink Composition Attachment Process

The ink composition attachment process is a process of attaching the pigment textile printing ink jet ink composition according to this embodiment to a part of a fabric or at least one part of a region where the treatment liquid composition is attached by the above-described treatment liquid composition attachment process, and then attaching a chromatic color pigment textile printing ink jet ink composition onto the region where the pigment textile printing ink jet ink composition is attached. Due to the fact that the ink composition attachment process has the two processes, two-layer printing in which an image is formed by the chromatic color pigment textile printing ink jet ink composition on an image formed by the pigment textile printing ink jet ink composition is recorded. When the treatment liquid composition attachment process is included, the image of a first layer is an image excellent in color developability and rubbing fastness because the components of the pigment textile printing ink jet ink composition and the components of the treatment liquid composition react or interact with each other to thereby coagulate.

In the ink composition attachment process, when the pigment textile printing ink jet ink composition is a white pigment textile printing ink jet ink composition, the white pigment textile printing ink jet ink composition is preferably attached so that the maximum attachment amount to a fabric is 50 mg/cm$^2$ or more and 200 mg/cm$^2$ or less, more preferably attached so that the maximum attachment amount to a fabric is 80 mg/cm$^2$ or more and 150 mg/cm$^2$ or less, and still more preferably attached so that the maximum attachment amount to a fabric is 90 mg/cm$^2$ or more and 130 mg/cm$^2$ or less. When the maximum attachment amount of the white pigment textile printing ink jet ink composition is as described above, the white color developability is improved, the color development particularly when attached to a deep color fabric is excellent, an image to be obtained is preferable as a background image. The attachment amount within the range mentioned above is preferable because there is a tendency that the rubbing fastness of an image is excellent and coagulation unevenness is not conspicuous.

On the other hand, in the ink composition attachment process, the maximum attachment amount of the chromatic color pigment textile printing ink jet ink composition can be set to 1 mg/cm$^2$ or more and 200 mg/cm$^2$ or less. It is preferable to set the maximum attachment amount of the chromatic color pigment textile printing ink jet ink composition to preferably 1 mg/cm$^2$ or more and 30 mg/cm$^2$ or less, more preferably 2 mg/cm$^2$ or more and 25 mg/cm 2 or less, still more preferably 5 mg/cm$^2$ or more and 20 mg/cm$^2$ or less, and particularly preferably 7 mg/cm$^2$ or more and 15 mg/cm$^2$ or less in the points that the color developability of an image to be recorded is improved, the drying property of an image to be recorded is improved, the blurring of an image can be suppressed, and images, such as pictures and characters, can be recorded on a fabric with good reproducibility.

5.3. Heating Process

The ink jet pigment textile printing method according to this embodiment preferably has a process of heating a fabric in the ink composition attachment process. In the ink jet textile printing, when a fabric is heated in the ink composition attachment process, the viscosity and the surface tension decrease due to the fact that the temperature of the ink is high, so that the ink easily uniformly wets and spreads to the fabric and easily permeates into the fabric. Moreover, in this embodiment, the permeation of the ink is controlled by the nonionic fluorine-based surfactant contained in the ink composition, and therefore the ink uniformly wets and spreads onto the surface of a fabric. Thus, the ink is easily fixed to a fabric, so that the leveling property is improved and the rubbing fastness is excellent in the obtained recorded matter. By attaching the ink composition onto a heated fabric, the drying property of the ink can be improved and the drying time can be shortened, so that damages to the fabric can be suppressed.

Examples of a heating method for heating the ink composition given to a fabric include the heating mechanism 6 illustrated in FIGURE. As the heating mechanism, a heat press method, a normal pressure steam method, a high pressure steam method, a hot air drying method, a thermofix method, and the like are mentioned besides the mechanism mentioned above.

In the heating process, the surface temperature of the heated fabric is 35° C. or more and 65° C. or less. Due to the fact that the surface temperature of the surface of the fabric is within the range mentioned above, damages to an ink jet head or a fabric can be reduced and the ink easily uniformly wets and spreads to a fabric and easily permeates into a fabric. The heating temperature in this heating process refers to the surface temperature of the heated fabric and can be measured using a noncontact thermometer (Trade Name "IT2-80", manufactured by KEYENCE), for example. The surface temperature of the surface of the heated fabric is preferably 40° C. or more and more preferably 45° C. or more. The upper limit of the surface temperature is preferably 60° C. or less and more preferably 55° C. or less.

The heating time is not particularly limited insofar as the temperature of the fabric surface is within the temperature range mentioned above and, for example, can be set to 5 seconds or more and 1 minute or less and is preferably 10 seconds or more and 30 seconds or less. Due to the fact that the heating time is within the range mentioned above, the fabric can be sufficiently heated while reducing damages to an ink jet head or the fabric.

Besides the heating process, a process of heating or drying the fabric M after the ink composition attachment process by providing the second heating mechanism on the downstream side in the transporting direction of the fabric M as described with reference to FIGURE may be included. In this case, the second heating mechanism is disposed on the downstream side in the transporting direction of the fabric M relative to the heating mechanism 6 of FIGURE. Thus, the drying property of droplets of the ink attached to the fabric M can be improved. For the second heating mechanism, any one of the mechanisms (for example, drier mechanism and the like) described in the heating mechanism 6 are usable.

The heating temperature in this case is not limited to the following temperatures and is preferably 100° C. or more and 200° C. or less, preferably 120° C. or more and 160° C. or less when the fabric is cotton, and more preferably 100° C. or more and 140° C. or less when the fabric contains polyester or polyester mixed yarn. Due to the fact that the heating temperature is within the range mentioned above, a reduction in the damages to the fabric and the coating of the resin particles contained in the ink composition can be promoted. The heating time is not limited to the following time and, for example, can be set to 30 seconds or more and 20 minutes or less and is preferably 2 minutes or more and 7 minutes or less and more preferably 3 minutes or more and 5 minutes or less. Due to the fact that the heating time is within the range mentioned above, the ink can be sufficiently dried while reducing damages to the fabric.

5.4. Operations and Effects

As described above, in the two-layer printing of performing the pigment textile printing using the ink containing a chromatic color pigment on the pigment textile printing using the pigment textile printing ink jet ink composition according to this embodiment, the ink jet pigment textile printing method according to this embodiment can improve not only the color developability of a first layer ink but the color developability of a second layer ink due to the fact that the first layer ink contains the nonionic fluorine-based surfactant. Thus, a printed textile excellent in color developability is obtained.

6. EXAMPLES AND COMPARATIVE EXAMPLES

Hereinafter, the invention is described with reference to Examples but the invention is not limited to Examples.

6.1. Preparation of White Ink and Color Ink

Each component was put into a container so as to have the compositions of Tables 1 and 2, mixed and stirred with a magnetic stirrer for 2 hours, and further subjected to dispersion treatment in a bead mill filled with zirconia beads 0.3 mm in diameter to be sufficiently mixed. After stirred for 1 hour, filtration was performed using a 5 μm PTFE membrane filter, so that pigment textile printing ink jet ink compositions were obtained. The numerical values in the tables indicate % by mass. Pure water (ion exchanged water) was added so that the mass of each textile printing ink jet ink composition was 100% by mass.

TABLE 1

|  |  | White ink 1 | White ink 2 | White ink 3 | White ink 4 | White ink 5 | White ink 6 |
|---|---|---|---|---|---|---|---|
|  | Pigment (TiO$_2$) | 12.0 | 12.0 | 12.0 | 12.0 | 12.0 | 12.0 |
|  | Water dispersible resin (TAKELAC WS-5100) | 10.0 | 10.0 | 10.0 | 10.0 | 10.0 | 10.0 |
| Organic solvent | Glycerol | 5.0 | 5.0 | 5.0 | 5.0 | 5.0 | 5.0 |
|  | Ethylene glycol | 5.0 | 5.0 | 5.0 | 5.0 | 5.0 | 5.0 |
|  | 1,2-hexanediol | 1.0 | 1.0 | 1.0 | 1.0 | 1.0 | 1.0 |
| Base | KOH | 0.2 | 0.2 | 0.2 | 0.2 | 0.2 | 0.2 |
|  | Triethanolamine | 1.0 | 1.0 | 1.0 | 1.0 | 1.0 | 1.0 |
| Surfactant | FS-300 (Nonionic fluorine-based surfactant) | 0.5 | 0.1 | 0.8 | — | — | — |
|  | S-241 (Nonionic fluorine-based surfactant) | — | — | — | 0.5 | — | — |

TABLE 1-continued

|  | White ink 1 | White ink 2 | White ink 3 | White ink 4 | White ink 5 | White ink 6 |
|---|---|---|---|---|---|---|
| Olfine E1010 | — | — | — | — | 0.5 | — |
| S-221 (Cationic fluorine-based surfactant) | — | — | — | — | — | 0.5 |
| Water | Balance | Balance | Balance | Balance | Balance | Balance |

TABLE 2

| | | Color ink 1 | Color ink 2 | Color ink 3 | Color ink 4 | Color ink 5 | Color ink 6 |
|---|---|---|---|---|---|---|---|
| Pigment (Pigment Blue 15:3) | | 4.0 | 4.0 | 4.0 | 4.0 | 4.0 | 4.0 |
| Water dispersible resin (TAKELAC WS-5100) | | 6.0 | 6.0 | 6.0 | 6.0 | 6.0 | 6.0 |
| Organic solvent | Glycerol | 8.0 | 8.0 | 8.0 | 8.0 | 8.0 | 8.0 |
| | Ethylene glycol | 7.0 | 7.0 | 7.0 | 7.0 | 7.0 | 7.0 |
| | 1,2-hexanediol | 1.0 | 1.0 | 1.0 | 1.0 | 1.0 | 1.0 |
| Base | KOH | 0.2 | 0.2 | 0.2 | 0.2 | 0.2 | 0.2 |
| | Triethanolamine | 1.0 | 1.0 | 1.0 | 1.0 | 1.0 | 1.0 |
| Surfactant | FS-300 (Nonionic fluorine-based surfactant) | 0.5 | 0.1 | 0.8 | | — | |
| | S-241 (Nonionic fluorine-based surfactant) | | | | 0.5 | | |
| | Olfine E1010 | — | — | — | — | 0.5 | — |
| | S-221 (Cationic fluorine-based surfactant) | | | | | | 0.5 |
| | Water | Balance | Balance | Balance | Balance | Balance | Balance |
| Total | | 100.0 | 100.0 | 100.0 | 100.0 | 100.0 | 100.0 |

In Tables 1 and 2, the details of components other than the compound name are as follows.

Water dispersible resin; TAKELAC WS-5100 (Trade Name, manufactured by Mitsui Chemicals & SKC Polyurethanes Inc., Polycarbonate-based urethane resin containing a blocked isocyanate as a crosslinkable group, The numerical values in the tables indicate the solid content of the urethane resin)

Fluorine-based surfactant; FS-300 (Trade Name, manufactured by DuPont, HLB value of 14.0, Hydrophilic group: polyoxyethylene, Hydrophobic group: Fluorinated alkyl, Nonionic type)

Fluorine-based surfactant; S-241 (Trade Name "Surflon S-241", manufactured by AGC SEIMI CHEMICAL CO., LTD., Nonionic type)

Olfine E1010 (Trade Name, manufactured by Nisshin Chemical Co., Ltd., Acetylene glycol-based surfactant)

Fluorine-based surfactant; S-221 (Trade Name "Surflon S-221", manufactured by AGC SEIMI CHEMICAL CO., LTD., Cationic type)

6.2. Production of Printed Textile

6.2.1. Production of Pretreatment Liquid

Ion exchanged water was added to 20 parts by mass of calcium nitrate tetrahydrate (Ca: 17%), 2 parts by mass of a fixing resin (Trade Name "Mowinyl 6960"), and 0.5 part by mass of a surfactant (Trade Name "Olfine E1010", manufactured by Nisshin Chemical Co., Ltd., Acetylene glycol-based surfactant) so that the total mass was 100% by mass, mixed, and then stirred to give a pretreatment liquid.

6.2.2. Production of Printed Textile

Pretreatment

A commercially-available T-shirt fabric was prepared as a fabric, and then the pretreatment liquid obtained above was uniformly applied thereto using a roller so as to be 18 to 20 g per A4 size. After the application of the pretreatment liquid, heat treatment was performed at 160° C. for 1 minute with a heat press machine. As T-shirts fabrics given in Tables 3 and 4, the following three kinds of fabrics were used.

T-Shirt Fabric

Cotton (manufactured by Hanes, Heavyweight black, 100% cotton)

PES (glimmer ACTIVE WEAR, 3.5 oz, Dry T-shirt, Black, 100% polyester)

Mixed yarn (Printstar, 4.6 oz, Honeycomb mesh T-shirt, Black, Cotton/Polyester:45/55)

Textile Printing of White or Color Ink

Inks given in Table 1 or 2 were applied to the fabrics after the pretreatment by an ink jet method using an ink jet printer (PX-G930: manufactured by Seiko Epson Corp.). As a printing pattern, printing was performed under the conditions where the resolution was set to 1440×1440 dpi and solid printing was overlapped 4 times to obtain textile printed fabrics. Thereafter, heat treatment was performed at 160° C. for 1 minute with a heat press machine to fix the ink to the fabric to thereby obtain textile printed fabrics. Two-layer textile printing of white ink and color ink White inks given in Table 1 or 2 were applied to the fabric after the pretreatment by an ink jet method using an ink jet printer (PX-G930: manufactured by Seiko Epson Corp.). As a printing pattern, printing was performed under the conditions where the resolution was set to 1440×1440 dpi and solid printing was overlapped 4 times to obtain fabrics textile printed with the white inks. Subsequently, the fabric textile printed with the white ink was not dried, and the color ink given in Table 2 was printed once under the same conditions to be overlapped on a region textile printed with the white ink. Thereafter, heat treatment was performed at 160° C. for 1 minute with a heat press machine to fix the white ink and the color ink to the fabric to obtain fabrics in which the color ink was textile printed on the white ink. The white inks and the color inks were combined in the combinations given in Table 4.

color development is determined to be A or higher, it can be said that the effects of the invention of this application are obtained.

Evaluation Criteria of White Ink
AA: 80≤L*
A: 75≤L*<80
B: 70≤L*<75
C: 65≤L*<70
D: L*<65

TABLE 3

|  | Ex. 1 | Ex. 2 | Ex. 3 | Ex. 4 | Ex. 5 | Ex. 6 |
|---|---|---|---|---|---|---|
| Ink type | White ink 1 | White ink 2 | White ink 3 | White ink 1 | White ink 1 | White ink 4 |
| Fabric | PES | PES | PES | Cotton | Mixed yarn | PES |
| Color development | AA | A | AA | AA | AA | AA |

|  | Ex. 7 | Ex. 8 | Ex. 9 | Ex. 10 | Ex. 11 | Ex. 12 |
|---|---|---|---|---|---|---|
| Ink type | Color ink 1 | Color ink 2 | Color ink 3 | Color ink 1 | Color ink 1 | Color ink 4 |
| Fabric | PES | PES | PES | Cotton | Mixed yarn | PES |
| Color development | AA | A | AA | AA | AA | AA |

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Ink type | White ink 5 | White ink 1 | White ink 5 | Color ink 5 | Color ink 5 | Color ink 6 |
| Fabric | PES | PES | Cotton | PES | Cotton | PES |
| Color development | C | B | B | E | D | D |

TABLE 4

|  | Ex. 13 | Ex. 14 | Ex. 15 | Ex. 16 | Ex. 17 |
|---|---|---|---|---|---|
| White ink | White ink 1 | White ink 2 | White ink 3 | White ink 1 | White ink 1 |
| Color ink | Color ink 5 | Color ink 5 | Color ink 5 | Color ink 5 | Color ink 5 |
| Fabric | PES | PES | PES | Cotton | Mixed yarn |
| Color development (Color ink) | AA | A | AA | AA | AA |
| Rubbing fastness (Color ink) | B | A | C | B | B |

|  | Ex. 18 | Ex. 19 | Comp. Ex. 7 | Comp. Ex. 8 | Comp. Ex. 9 |
|---|---|---|---|---|---|
| White ink | White ink 4 | White ink 1 | White ink 5 | White ink 6 | White ink 5 |
| Color ink | Color ink 5 | Color ink 1 | Color ink 5 | Color ink 5 | Color ink 5 |
| Fabric | PES | PES | PES | PES | Cotton |
| Color development (Color ink) | AA | AA | E | E | D |
| Rubbing fastness (Color ink) | B | D | B | D | B |

6.3. Evaluation Test

The fabrics obtained by textile printing of the white or color inks were evaluated for color development and clogging. Moreover, the fabrics obtained by the two-layer textile printing of the white ink and the color ink were evaluated for color development of the color ink textile printed on the white ink and rubbing fastness of the color ink textile printed on the white ink.

6.3.1. Evaluation of Color Development

For the fabrics after the textile printing, the L* value in the CIE/L*a*b* color system was measured using a commercially-available colorimeter (Product Name "Gretag Macbeth Spectrolino", manufactured by X-Rite), and then determined based on the following evaluation criteria. When the Evaluation Criteria of Color Ink
AA: 70≤L*
A: 65≤L*<70
B: 60≤L*<65
C: 55≤L*<60
D: L*<55

6.3.2. Clogging Property Test

A white ink or a color ink was charged into a head using an ink jet printer PX-G930 (Trade Name, manufactured by Seiko Epson Corp.), and then it was confirmed that the ink composition was discharged from all the nozzles. Thereafter, the ink jet printer was allowed to stand in a 40° C. environment for 1 week at a position outside the home position (state where the head shifted from the position of a cap provided in the printer, so that the head was not capped).

After allowed to stand, the number of times of cleaning required for the ink composition to be discharged from all the nozzles again was counted, and then determined based on the following evaluation criteria.

Evaluation Criteria

A: Recovered by 1 to 5 times of cleaning
B: Recovered by 6 to 10 times of cleaning
C: Recovered by 11 to 15 times of cleaning
D: Recovered by 16 or more times of cleaning 6.3.3. Evaluation of Color Development of Color Ink on White Ink Layer For the fabrics after the textile printing, the L* value in the CIE/L*a*b* color system was measured using a commercially-available colorimeter (Product Name "Gretag Macbeth Spectrolino", manufactured by X-Rite), and then determined based on the following evaluation criteria. In Table 4, "Color development (color ink)" evaluates the color development of the color ink applied onto the white ink. When the color development is determined to be A or higher, it can be said that the effects of the invention of this application are obtained.

Evaluation Criteria

AA: 80≤L*
A: 75≤L*<80
B: 70≤L*<75
C: 65≤L*<70
D: 60≤L*<65
E: L*<60

6.3.4. Evaluation of Rubbing Fastness of Color Ink on White Ink Layer

To the fabrics after the textile printing, a color fastness test to rubbing was carried out using an I type (clock meter) testing machine according to a drying test specified in ISO-105 X12. The evaluation was performed using a contamination gray scale. The evaluation criteria were as follows and the results are given in Table 4. In Table 4, "Rubbing fastness (color ink)" evaluates the rubbing fastness of the color ink applied onto the white ink.

Evaluation Criteria

A: Rubbing fastness is Class 4 or higher.
B: Rubbing fastness is Class 3 or higher and less than Class 4.
C: Rubbing fastness is Class 2 or higher and less than Class 3.
D: Rubbing fastness is less than Class 2.

6.4. Evaluation Results

Examples 1 to 19 had the results that the color developability is higher than that of Comparative Examples 1 to 9.

First, the color developability of the white inks is described based on the comparison between Examples 1 to 6 and Comparative Examples 1 to 3.

Example 1 in which the white ink contains the nonionic fluorine-based surfactant had the result that the color developability to the PES used as the fabric was higher than that of Comparative Example 1. In Example 2 in which the content of the nonionic fluorine-based surfactant of the white ink is lower than that of Example 1, the color developability slightly decreased but was sufficient for the purpose. On the other hand, Example 3 in which the content of the nonionic fluorine-based surfactant of the white ink is higher than that of Example 1 had the result that the color developability was high similarly to Example 1.

Also in Examples 4 and 5 using fabrics different from that of Example 1, the color developability was high similarly to Example 1. As shown by the comparison between Comparative Examples 1 and 3, when a former PES was used, the color developability tended to be inferior to that of cotton. However, the results of Examples 1, 4, and 5 showed that the same good evaluation as that in the case of using cotton was obtained also in the case of using the PES.

Also in Example 6 using a nonionic fluorine-based surfactant different from that of Example 1, the color developability was high.

Next, the color developability of the color inks is described based on the comparison between Examples 7 to 12 and Comparative Examples 4 to 6.

Also Examples 7 to 12 in which the color ink contains the nonionic fluorine-based surfactant had the results that the color developability was high also to the fabrics of PES or mixed yarn similarly to the case where the white ink contains the nonionic fluorine-based surfactant.

Examples 13 to 19 are examples in which a white ink image was printed as a base, and then a color ink was printed on the white ink and are examples of using at least an ink falling under the invention as the white ink. Among the above, Examples 13 to 18 are examples in which the color inks do not contain the nonionic fluorine-based surfactant and Example 19 is an example in which the color ink contains the nonionic fluorine-based surfactant.

Example 13 had the result that the color developability of the color ink printed on the white ink was high. In Example 14 in which the content of the nonionic fluorine-based surfactant of the white ink is lower than that of Example 13, the color developability slightly decreased but was sufficient for the purpose. The rubbing fastness was further improved than Example 13. This is considered to be because the compatibility between the white base formed with the white ink and the color ink applied thereonto was improved. On the other hand, in Example 15 in which the content of the nonionic fluorine-based surfactant of the white ink is higher than that of Example 13, the color developability was high similarly to Example 13 but the rubbing fastness slightly decreased.

Also Examples 16 and 17 using fabrics different from the fabric of Example 13 had the results that the color developability and the rubbing fastness of the color inks were high similarly to Example 13.

Also Example 18 using a nonionic fluorine-based surfactant different from that of Example 13 had the result that the color developability and the rubbing fastness of the color inks were high similarly to Example 13.

Example 19 using a color ink different from that of Example 13 had the result that the evaluation of the color developability was high but the rubbing fastness slightly decreased. This is considered to be because the compatibility between the white ink of a lower layer and the color ink of an upper layer decreased.

All Comparative Examples 1 to 9 outside the range of the invention had the results that the color developability was low. In Comparative Example 2 (white ink) and Comparative Example 6 (color ink) in which the surfactants were the cationic fluorine-based surfactants, the color developability slightly improved but was not sufficient for the purpose. This is considered to be because the surfactants having cationic properties were brought into an association state on the surface of the fabric to be unevenly distributed to cause unevenness.

The invention is not limited to the embodiments described above and can be variously modified. For example, the invention includes the substantially same structures (e.g., structures with the same function(s), method(s), and result(s) or structures with the same object(s) and effect(s)) as the structures described in the embodiments. The invention also includes structures in which non-essential portions of the structures described in the embodiments are replaced. The invention also includes structures that can demonstrate the same operational effects or structures that can achieve the same objects as those in the structures described in the embodiments. The invention also includes structures in which known techniques are added to the structures described in the embodiments.

The entire disclosure of Japanese Patent Application No. 2018-022194, filed Feb. 9, 2018 is expressly incorporated by reference herein.

What is claimed is:

1. An ink jet pigment textile printing method comprising:
    attaching a white pigment textile printing ink jet ink composition to a fabric so that a maximum attachment amount of the white pigment textile printing ink jet ink composition to the fabric is 50 mg/cm$^2$ or more and 200 mg/cm$^2$ or less;
    attaching a chromatic color pigment textile printing ink jet ink composition to the fabric on a region where the white pigment textile printing ink jet ink composition is attached so that a maximum attached amount of the chromatic color pigment textile printing ink jet ink composition is 1 mg/cm$^2$ or more and 200 mg/cm$^2$ or less; and then
    heating the fabric at a heating temperature of 120° C. or more and 160° C. or less,
    wherein:
        the white pigment textile printing ink jet ink composition comprises:
            a white pigment;
            polycarbonate-based urethane resin particles as the only resin particles in the pigment textile printing ink jet ink composition;
            a nonionic fluorine-based surfactant; and
            water, and
        the chromatic color pigment textile printing ink jet ink composition comprises:
            a chromatic color pigment;
            a resin particle; and
            water.

2. An ink jet pigment textile printing method comprising:
    attaching a white pigment textile printing ink jet ink composition to a fabric so that a maximum attachment amount of the white pigment textile printing ink jet ink composition to the fabric is 50 mg/cm$^2$ or more and 200 mg/cm$^2$ or less;
    attaching a chromatic color pigment textile printing ink jet ink composition to the fabric on a region where the white pigment textile printing ink jet ink composition is attached; and then
    heating the fabric at a heating temperature of 120° C. or more and 160° C. or less,
    wherein:
        the fabric contains polyester or polyester mixed yarn,
        the white pigment textile printing ink jet ink composition comprises:
            a white pigment;
            polycarbonate-based urethane resin particles as the only resin particles in the pigment textile printing ink jet ink composition;
            a nonionic fluorine-based surfactant; and
            water, and
        the chromatic color pigment textile printing ink jet ink composition comprises:
            a chromatic color pigment;
            a resin particle; and
            water.

3. The ink jet pigment textile printing method according to claim 1, wherein
    a content of the nonionic fluorine-based surfactant in the chromatic color pigment textile printing ink jet ink composition is 0.5% by mass or less relative to a total mass of the chromatic color pigment textile printing ink jet ink composition.

4. The ink jet pigment textile printing method according to claim 1, wherein
    the fabric is a fabric to which a polyvalent metal salt is attached.

5. The ink jet pigment textile printing method according to claim 2, wherein
    a content of the nonionic fluorine-based surfactant in the chromatic color pigment textile printing ink jet ink composition is 0.5% by mass or less relative to a total mass of the chromatic color pigment textile printing ink jet ink composition.

6. The ink jet pigment textile printing method according to claim 2, wherein
    the fabric is a fabric to which a polyvalent metal salt is attached.

* * * * *